US009197953B2

(12) United States Patent
Simpson et al.

(10) Patent No.: US 9,197,953 B2
(45) Date of Patent: Nov. 24, 2015

(54) ADJUSTABLE MOUNTING ASSEMBLY

(71) Applicant: QSC Audio Products, LLC, Costa Mesa, CA (US)

(72) Inventors: Dave Neil Simpson, Huntington Beach, CA (US); Bernard Francis Hawkins, Long Beach, CA (US); Yasushi Richard Shimabukuro, Mission Viejo, CA (US); Jason Delarm, Huntington Beach, CA (US); Douglas William Teulie, Huntington Beach, CA (US); Alex Aranda, Costa Mesa, CA (US)

(73) Assignee: QSC Audio Products, LLC, Costa Mesa, CA (US)

( * ) Notice: Subject to any disclaimer, the term of this patent is extended or adjusted under 35 U.S.C. 154(b) by 0 days.

(21) Appl. No.: 14/673,511

(22) Filed: Mar. 30, 2015

(65) Prior Publication Data

US 2015/0215690 A1    Jul. 30, 2015

Related U.S. Application Data

(63) Continuation of application No. 13/742,224, filed on Jan. 15, 2013, now Pat. No. 9,016,645.

(60) Provisional application No. 61/749,862, filed on Jan. 7, 2013.

(51) Int. Cl.
| *F16M 11/12* | (2006.01) |
| *H04R 1/02* | (2006.01) |
| *F16M 13/02* | (2006.01) |
| *F16M 11/14* | (2006.01) |
| *F16M 11/20* | (2006.01) |

(52) U.S. Cl.
CPC ............... *H04R 1/026* (2013.01); *F16M 11/14* (2013.01); *F16M 11/2028* (2013.01); *F16M 13/02* (2013.01); *H04R 2201/021* (2013.01)

(58) Field of Classification Search
CPC .. H04R 1/026; H04R 2201/021; F16M 13/02; F16M 11/14; F16M 11/2028
USPC ............... 248/278.1, 921, 923, 274.1, 276.1, 248/292.12, 288.31, 357, 372.1, 917, 919; 403/90, 122, 124, 125
See application file for complete search history.

(56) References Cited

U.S. PATENT DOCUMENTS

| 360,561 | A | * | 4/1887 | Clow ............................... 403/97 |
| 3,911,221 | A | * | 10/1975 | Wong ............................ 381/387 |
| 4,157,876 | A | * | 6/1979 | DiGiulio ........................ 403/90 |
| 5,016,851 | A | * | 5/1991 | Koskinen et al. .......... 248/278.1 |

(Continued)

*Primary Examiner* — Anita M King
(74) *Attorney, Agent, or Firm* — Perkins Coie LLP

(57) ABSTRACT

An adjustable mounting assembly has first and second mounting portions. The first mounting portion has an engagement arm with an adjustable end having first engagement teeth disposed about a first axis of rotation. The end portion has an adjustable second portion rotatable about the first axis of rotation, and having second engagement teeth that intermesh with the first engagement teeth to retain the second portion in an adjustable pan-position. The second portion has third engagement teeth disposed about a second axis of rotation angularly offset from the first axis of rotation. A second mounting portion is adjustably attached at an attachment portion to the first mounting portion, and the attachment portion has fourth engagement teeth disposed about the second axis of rotation that intermesh with the third engagement teeth to retain the second mounting portion is a selected tilt position.

20 Claims, 16 Drawing Sheets

(56) References Cited

U.S. PATENT DOCUMENTS

| | | | |
|---|---|---|---|
| 5,118,058 A * | 6/1992 | Richter | 248/183.2 |
| 5,251,859 A * | 10/1993 | Cyrell et al. | 248/288.51 |
| 5,704,581 A * | 1/1998 | Chen | 248/371 |
| 5,730,409 A * | 3/1998 | Baron et al. | 248/292.12 |
| 5,790,910 A * | 8/1998 | Haskin | 396/427 |
| 6,347,776 B1 * | 2/2002 | Chuang | 248/288.51 |
| 6,634,804 B1 * | 10/2003 | Toste et al. | 396/427 |
| D491,553 S * | 6/2004 | Cook | D14/214 |
| 6,874,743 B2 * | 4/2005 | Watanabe et al. | 248/276.1 |
| 7,000,878 B2 * | 2/2006 | Lin | 248/276.1 |
| 7,564,682 B2 * | 7/2009 | Liou et al. | 361/679.22 |
| 7,658,554 B2 * | 2/2010 | Takahashi | 396/427 |
| 8,267,361 B1 * | 9/2012 | Dordick | 248/181.1 |
| 8,632,042 B2 * | 1/2014 | Hoel | 248/372.1 |
| 8,724,842 B2 * | 5/2014 | Sumitani et al. | 381/387 |
| 2004/0227049 A1 * | 11/2004 | Lang et al. | 248/476 |

* cited by examiner

ADJUSTABLE MOUNTING ASSEMBLY

CROSS REFERENCE TO RELATED APPLICATIONS

This application is a continuation of U.S. patent application Ser. No. 13/742,224, filed Jan. 15, 2013, entitled ADJUSTABLE MOUNTING ASSEMBLY, which claims the benefit of U.S. Provisional Patent Application No. 61/749,862, filed Jan. 7, 2013, entitled ADJUSTABLE MOUNTING ASSEMBLY, all of which are incorporated herein by reference in their entireties.

TECHNICAL FIELD

Embodiments of the present disclosure are directed to mounting assemblies, and more particularly to adjustable mounting assemblies useable with mounted devices, including audio and/or visual equipment.

BACKGROUND

Adjustable mounting brackets of the prior art have used gimbaled joints and other ball-and-socket joints that hold the mounted object in a selected orientation. These ball-and-socket joints and gimbaled joints, however, typically have smooth engagement surfaces and rely on pressure and frictional engagement between the ball and socket to resist movement of the mounted device away from the selected orientation. These configurations are often victim to uneven and/or excessive pressure in the joint that can break or cause excessive wear on the joint over time. Such excessive joint wear reduces the joint's capacity to securely hold the mounted object without slip or creep away from the selected orientation, thereby eventually rendering the joint ineffective.

Conventional ball-and-socket joints and other gimbal joints typically can only support a limited amount of weight due to the interface at the joint structure. Such weight limit restrictions can often require over-sized structures, which can increase the bracket's footprint and the mounting bracket's cost. U.S. Pat. No. 5,251,859 discloses an improved clamping arrangement for a mounting assembly, but the clamping arrangement still has limitations. Accordingly, there is a need for an improved adjustable mounting assembly for use with, as an example, audio and/or visual equipment and other mounted devices.

SUMMARY

The present disclosure is directed to adjustable mounting assemblies that overcome drawbacks experienced in the prior art and provides additional benefits. At least one embodiment of the present disclosure provides an adjustable mounting assembly configured for coupling a mounted device to a support structure. The mounting assembly has a first mounting portion with a mounting member fixable to the support structure. An engagement arm is adjustably connected to the mounting member and has a support portion spaced apart from the mounting member. The support portion has first engagement members disposed about a first axis of rotation angularly offset from a longitudinal axis of the engagement arm. An adjustment member is attached to the support portion of the engagement arm and is rotatable relative to the support portion about the first axis of rotation. The adjustment member has second engagement members disposed about the first axis of rotation. The adjustment member has a first locked position with the second engagement members intermeshed with the first engagement members to retain the adjustment member in a first pan-position relative to the support portion and to restrict the adjustment member from rotating relative to the support portion away from the first pan-position. The adjustment member has a first released position wherein the first and second engagement members are adjacent to each other and positioned to allow the adjustment member to rotate relative to the support portion about the first axis of rotation to a second pan-position. The adjustment member has an arcuate first engagement portion facing away from the support portion and third engagement members disposed on the first engagement portion about a second axis of rotation angularly offset from the first axis of rotation and the longitudinal axis.

A second mounting portion is coupleable to the mounted device and has an attachment portion adjustably connected to the first mounting portion. The attachment portion has an arcuate second engagement portion in mating arrangement with the first engagement portion of the adjustment member. The attachment portion has fourth engagement members disposed on the second engagement portion about the second axis of rotation. The second mounting portion has a second locked position with the fourth engagement members intermeshed with the third engagement members to restrict the second engagement surface from moving about the second axis of rotation relative to the first engagement surface. The second mounting portion has a second released position wherein the third and fourth engagement members are adjacent to each other and positioned to allow the second engagement surface to rotate relative to the first engagement surface about the second axis of rotation.

A locking device is connected to the first and second mounting portions. The locking device releasably locks the third and fourth engagement members together with the second mounting portion in a first tilt position relative to the first mounting portion, and restricts the second mounting portion from rotating relative to the first mounting portion about the second axis of rotation. The locking member is moveable to a released position that allows the second mounting portion to move about the second axis of rotation to a second tilt position relative to the first mounting portion.

Another aspect of the present disclosure provides an adjustable mounting assembly having a first mounting portion with a mounting member fixable to the support structure. The first mounting portion has an engagement arm connected to the mounting member. The engagement arm has an adjustable end portion spaced apart from the mounting member, the end portion having first engagement members disposed about a first axis of rotation angularly offset from the longitudinal axis of the engagement arm. The end portion has an adjustable second portion rotatable relative to the first portion about the first axis of rotation. The second portion has second engagement members. The second portion has a first locked position with the second engagement members intermeshed with the first engagement members to retain the second portion in a first pan-position, and a first released position wherein the first and second engagement members are adjacent to each other and positioned to allow the second portion to rotate relative to the first portion to a second pan-position. The second portion has third engagement members disposed about a second axis of rotation angularly offset from the first axis of rotation.

A second mounting portion coupleable to the mounted device is adjustably attached at an attachment portion to the first mounting portion. The attachment portion is in mating arrangement with the second portion of the first engagement surface, and the attachment portion has fourth engagement members disposed about the second axis of rotation. The second mounting portion has a second locked position with the fourth engagement members intermeshed with the third engagement members. The second mounting portion has a second released position wherein the third and fourth engagement members are adjacent to each other and are positioned to allow the second engagement surface to rotate relative to the first engagement surface about the second axis of rotation.

Another aspect of the disclosure provides an audio or visual equipment mounting assembly with a first mounting portion having a mounting member fixable to a support structure. An engagement arm is connected to the mounting member and is rotatable about a first axis of rotation. The engagement arm has an intermediate portion projecting away from the mounting member and a distal end portion connected to the intermediate portion. The distal end portion has first engagement members disposed about a second axis of rotation angularly offset from the first axis of rotation. An adjustment member is attached to the distal end portion, wherein the adjustment member is rotatable relative to the distal end portion about the second axis of rotation. The adjustment member has second engagement members disposed about the second axis of rotation and that mate with the first engagement members.

The adjustment member has a first locked position with the first and second engagement members intermeshed with each other releasably fixing the adjustment member in a first rotational position and restricting the adjustment member from rotating about the second axis of rotation away from the first rotational position. The adjustment member has a first released position wherein the first and second engagement members are positioned to allow the adjustment member to rotate relative to the distal end portion about the second axis of rotation to a second rotational position. The adjustment member has an exterior surface facing away from the distal end portion and third engagement members are disposed in an arcuate pattern about a third axis of rotation angularly offset from the first and second axes of rotation.

A second mounting portion coupleable to the audio or visual equipment has an attachment portion adjustably attached to the adjustment member of the first mounting portion. The attachment portion has fourth engaging members disposed in an arcuate pattern relative to the third axis of rotation for mating with the third engagement members. The second mounting portion has a second locked position with the fourth engagement members intermeshed with the third engagement members to restrict the attachment portion from moving relative to the adjustment member about the third axis of rotation. The second mounting portion has a second released position wherein the third and fourth engagement members are adjacent to each other and positioned to allow the attachment portion to move relative to the adjustment member about the third axis of rotation. A locking device is connected to the second mounting portion and releasably secures the second mounting portion in the second locked position. The locking member is moveable to an unlocked position that allows the second mounting portion to move about the third axis of rotation.

Another embodiment provides a speaker mounting assembly configured for adjustably interconnecting a speaker to a support structure. The speaker mounting assembly has a first mounting portion having a mounting plate fixable to the support structure. An engagement arm has first and second end portions, and the first end portion is adjustably attached to the mounting plate. The engagement arm is rotatable relative to the mounting plate about a first axis of rotation substantially normal to the mounting plate. The second end portion is spaced apart from the mounting plate. A first locking device is connected to the mounting plate and to the first end of the engagement arm. The locking device releasably restricts the engagement arm from rotating about the first axis of rotation relative to the mounting plate.

An adjustable spherical engagement ball portion has first and second ball portions, and the first ball portion is integrally connected to the second end portion of the engagement arm. The first ball portion has an engagement surface substantially parallel to the first axis of rotation and has a plurality of first gear teeth disposed about a second axis of rotation substantially normal to the first axis of rotation. The second ball portion is rotatably attached to the first ball portion and is rotatable relative to the first ball portion and the engagement arm about the second axis of rotation. The second ball portion has a plurality of second gear teeth that releasably interconnect with the first gear teeth. The second ball portion has a locked position with the first and second gear teeth intermeshed to prevent the second a ball portion from rotating relative to the first ball portion. The second ball portion has a released position in which the second ball portion is rotatably adjustable relative to the first ball portion. The second ball portion has a first arcuate engagement portion with plurality of third gear teeth projecting away from the first ball portion. A second locking mechanism releasably engages the first and second ball portions. The locking mechanism is moveable between a first engaged position and a first unlocked position. The first locking mechanism in the first engaged position securely locks the first and second ball portions together in the first locking position with the first and second gear teeth intermeshed to prevent rotation of the second ball portion relative to the first ball portion. The second ball portion is rotatable relative to the first ball portion when the first locking mechanism is in the first unlocked position.

A second mounting portion is adjustably attached to the first mounting portion. The second mounting portion has an attachment portion with a plurality of flanges that define an X-shape. The attachment portion has a speaker side opposite a support structure side. The attachment portion has a plurality of alignment tabs and a locking tab projecting from the speaker-side. The second mounting portion has a ball-receiving portion attached to and projecting from the support structure side of the attachment portion. The ball receiving portion has a substantially concave interior area and a second arcuate engagement portion with plurality of fourth gear teeth projecting therefrom and disposed in the interior area, wherein the second ball portion is disposed within the interior area with the first and second arcuate engagement portions connected to each other with the plurality of third gear teeth intermeshed with the plurality of fourth gear teeth.

The ball receiving portion is rotatable relative to the second ball portion about a third axis of rotation normal to the second axis of rotation and positionable normal to the first axis of rotation. The ball receiving portion is movable between an adjustment position and a fixed position, wherein the ball receiving portion in the adjustment position is movable about the third axis of rotation and in a direction parallel to the second arcuate engagement portion with the plurality of fourth gear teeth movable over the plurality of third gear teeth. The ball-receiving portion in the fixed position has the fourth gear teeth intermeshed with the third gear teeth of the second ball portion, wherein the third and fourth gear teeth lock the ball receiving portion and the second ball together restricting the ball receiving portion from moving about the third axis of rotation relative to the second ball portion. The ball receiving portion has substantially convex exterior area opposite the interior area, and a pair of spaced apart alignment flanges project away from the exterior area to define an arcuate channel in parallel alignment with the second arcuate engagement portion and the plurality of fourth gear teeth.

A locking device is attached to the ball receiving portion and releasably secures the ball receiving portion in engagement with the second ball portion. The locking device has a lock member releasably coupled to the engagement ball portion and has an arcuate pressure distribution member attached to a portion of the lock member and slidably disposed on the convex exterior area within the arcuate channel between the spaced apart alignment flanges. The locking device is movable between locked and released positions. When the locking device is in the locked position, the ball receiving portion is held in firm engagement with the second ball portion with the plurality of third and fourth teeth intermeshed to prevent the ball receiving portion from moving about the third axis of rotation relative to the second ball portion. When the locking device is in the released position, the ball receiving portion is movable about the third axis of rotation in a direction parallel with the arcuate channel for adjustment of a tilt position of the speaker relative to the first mounting portion. In one embodiment, when the locking device is in the released position, the ball receiving portion is movable about the second and third axes of rotation for adjustment of a tilt position of the speaker relative to the first mounting portion.

A mounting tray is removably attachable to the speaker, and the mounting tray has a substantially planar wall portion and a plurality of retention portions spaced apart from the wall portion, wherein the wall portion and the retention portions define an insertion track. The wall portion has a plurality of elongated alignment slots and a locking slot, wherein the attachment portion is slidable disposed in the insertion track with the alignment tabs slidably disposed in the alignment slots and the locking tab slidably disposed in the locking slot. The alignment portion is movable relative to the mounting tray when the alignment tabs and locking tab are in the alignment slots and locking slot, respectively, between first and second positions. The alignment portion in the first position has the plurality of flanges in an overlapped arrangement with the retention portions, whereby the retention portions block the alignment portion from moving in a direction normal to the planar wall portion and out of the mounting tray. The alignment portion in the second position has the plurality of flanges out of overlapping alignment with the retention portions, whereby the alignment portion are free to move in the normal direction relative to the planar wall portion for removal from the mounting tray.

A retention device is coupled to a speaker-side of the wall portion, and an anchor portion of the retention device is secured to the wall portion. A free end portion is positioned adjacent to the speaker-side of the wall portion. The free end portion is movable relative to the wall portion between a locking position and a release position. The retention device has a pair of biasing members that resiliently bias the retention device toward the locking position. The retention device has a retention tab extending at least partially into the locking slot when the free portion of the retention device is in the locking position, wherein the retention tab is substantially out of the locking slot when the free portion of the retention device is in the release position. The retention tab in the locking position is positioned adjacent to the locking tab in the locking slot when the alignment portion is in the first position. The retention tab in the locking position blocks the locking tab from sliding within the locking slot, thereby blocking the alignment portion from moving away from the first position. The locking tab is free to slide within the locking slot when the retention tab is in the released position, thereby allowing the alignment portion to move to the second position for removal of the attachment portion from the mounting tray.

A release mechanism is coupled to the wall portion adjacent to the insertion track and positioned to engage a portion of the retention device. The release mechanism is moveable relative to the wall portion between first and second positions. The release mechanism in the first position is adjacent to the portion of the retention device and allows the free end portion of the retention device to be in the locking position. The release mechanism in the second position engages the portion of the retention device and releasably holds the retention device in the release position.

Another aspect of the disclosure provides an adjustable mounting assembly comprising a first mounting portion having mounting member fixable to the support structure or the mounted device. A support portion is spaced apart from the mounting member and has first engagement members disposed about a first axis of rotation angularly offset from the longitudinal axis. An adjustment member is attached to the support portion and is rotatable relative to the support portion about the first axis of rotation. The adjustment member has second engagement members disposed about the first axis of rotation. The adjustment member has a first locked position with the second engagement members intermeshed with the first engagement members to retain the adjustment member in a first pan-position relative to the support portion and to restrict the adjustment member from rotating away from the first pan-position. The adjustment member has a first released position, wherein the first and second engagement members are positioned to allow the adjustment member to rotate relative to the support portion about the first axis of rotation to a second pan-position. The adjustment member has a first engagement portion facing away from the support portion. Third engagement members are disposed on the first engagement portion about a second axis of rotation angularly offset from the first axis of rotation and the longitudinal axis.

A second mounting portion has an attachment portion adjustably attached to the first mounting portion. The attachment portion has a second engagement portion in mating arrangement with the first engagement portion of the adjustment member. The attachment portion has fourth engagement members disposed on the second engagement portion about the second axis of rotation. The second mounting portion has a second locked position with the fourth engagement members intermeshed with the third engagement members to retain the second mounting portion in a first tilt position relative to the first mounting portion and to restrict the second engagement surface from moving about the second axis of rotation away from the first tilt position. The second mounting portion has a second released position wherein the third and fourth engagement members are adjacent to each other and positioned to allow the second engagement surface to rotate relative to the first engagement surface about the second axis of rotation to a second tilt position relative to the first mounting portion.

DETAILED DESCRIPTION

The present disclosure describes an adjustable mounting assembly in accordance with embodiments of the present invention. Several specific details of the embodiments are set forth in the following description and the Figures to provide a thorough understanding of the embodiments. One skilled in the art, however, will understand that the present invention may have additional embodiments, and that other embodiments of the invention may be practiced without several of the specific features described below.

Figure 1:
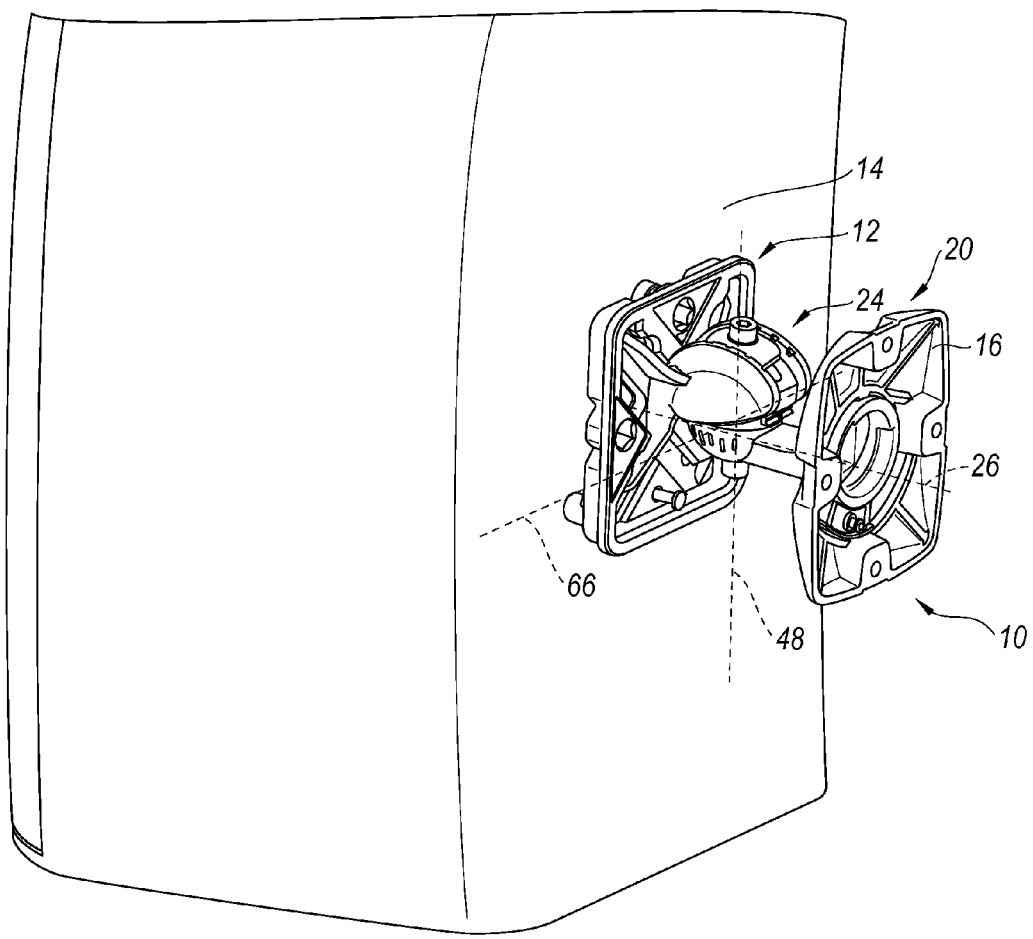
FIG. 1 is a rear perspective view of an adjustable mounting assembly for use with a mounted device, such as a speaker, in accordance with an embodiment of the present disclosure.

FIG. 1 is a rear perspective view of an adjustable mounting assembly 10 in accordance with an embodiment of the present disclosure. The adjustable mounting assembly 10 attaches at its forward end 12 to a selected mounted device. The adjustable mounting assembly 10 is shown in FIG. 1 and described herein for purposes of discussion as being attached at its forward end 12 to a speaker assembly 14. The mounting assembly 10, however, can be attached to other mounted devices, such as audio equipment, visual equipment, or other selected equipment or devices to be mounted to a supporting structure. The mounting assembly 10 has a mounting plate 16 at its rear end that mounts to the support structure 18 (FIG. 3), such as a wall, post, ceiling, or other supporting feature. Accordingly, the mounting assembly 10 interconnects the speaker 14 to the support structure 18 while allowing adjustment of the speaker's angular orientation relative to the support structure 18. As discussed in greater detail below, the mounting assembly 10 can be adjusted about three axes of rotation to allow for pan, tilt, and/or twist adjustment of the speaker 14, and then secured in a releasably locked position relative to the support structure 18, so as to avoid creep or slippage of speaker's position over time.

Figure 2:
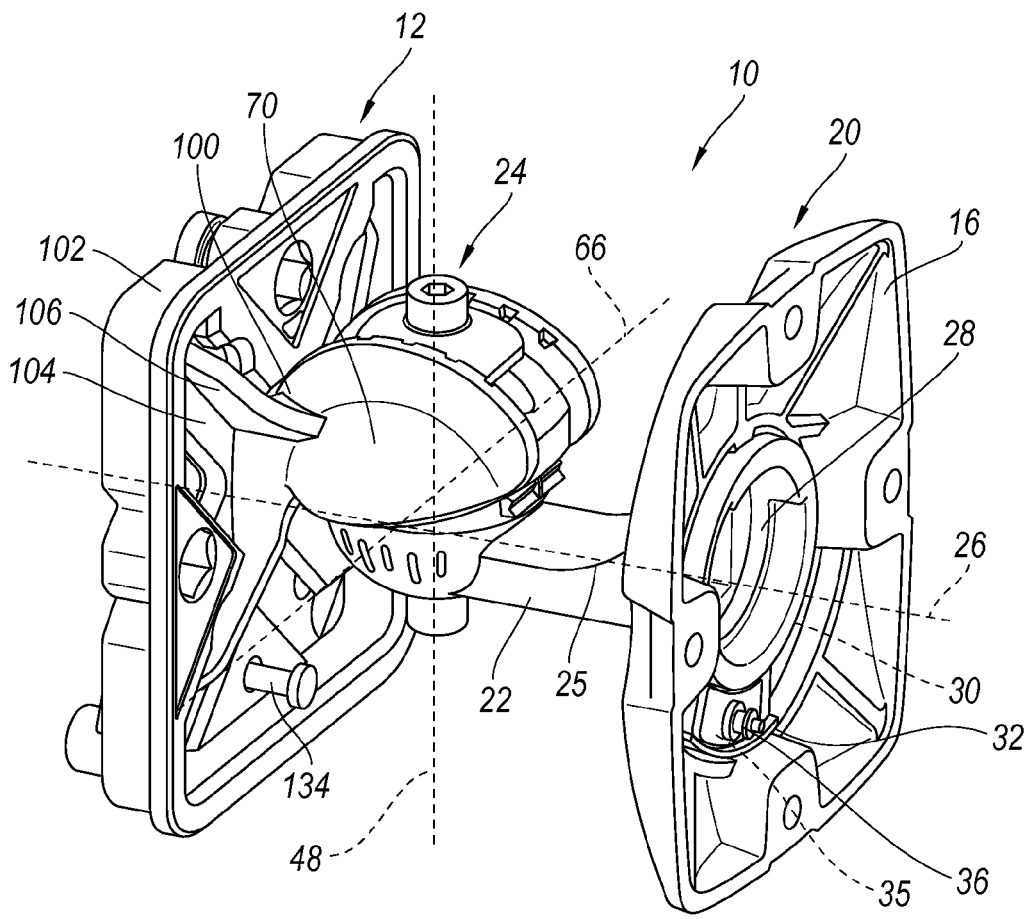
FIG. 2 is an enlarged rear perspective view of the adjustable mounting assembly of FIG. 1 shown separated from the speaker.
Figure 3:
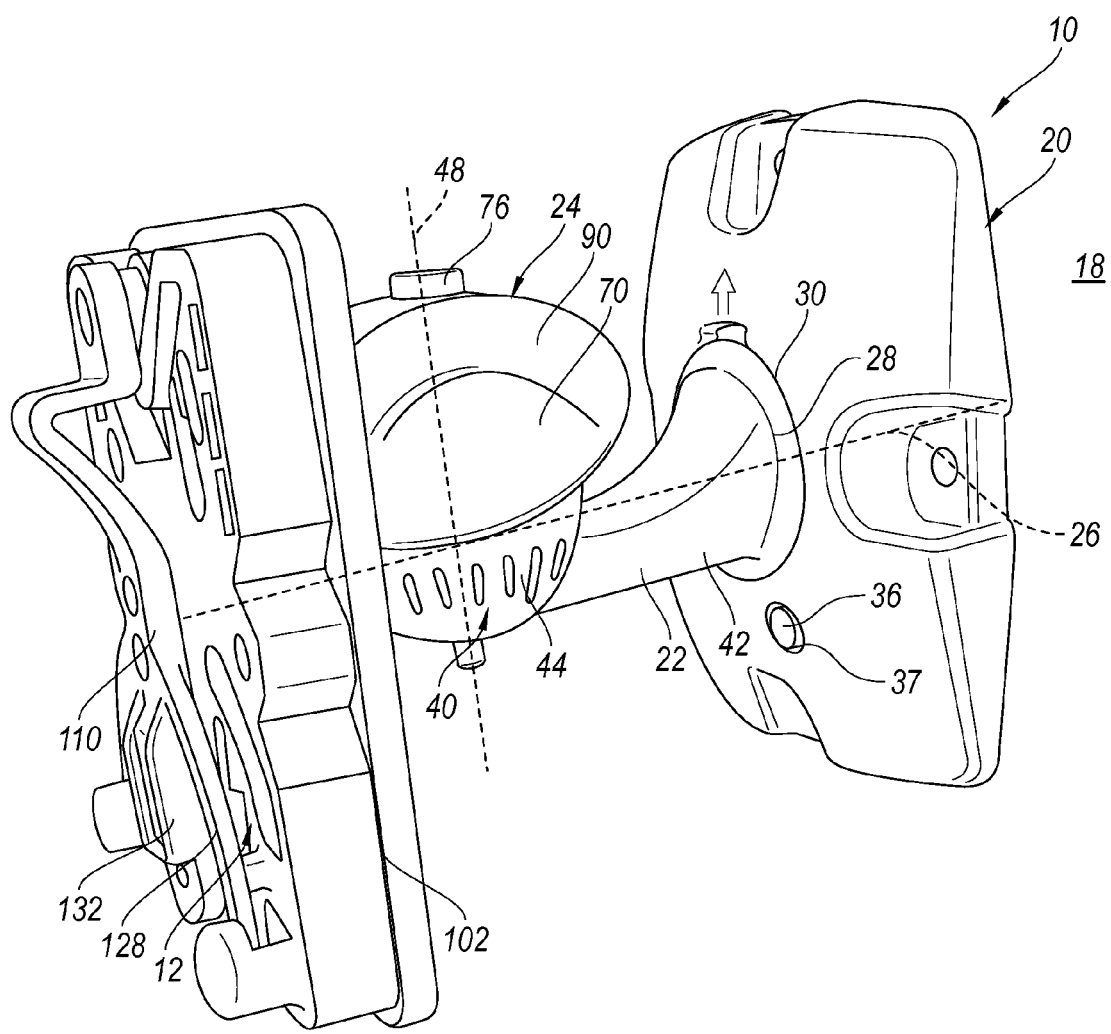
FIG. 3 is a front perspective view of the mounting assembly of FIG. 2 shown against a support structure.

FIG. 2 an enlarged rear perspective view of the mounting assembly 10 of FIG. 1 shown removed from the speaker 14 (FIG. 1). FIG. 3 is a front perspective view of the mounting assembly 10 shown against a support structure 18. The mounting assembly 10 has a first mounting portion 20 with the mounting plate 16 configured to securely fix the first mounting portion 20 to the support structure 18. The first mounting portion 20 has an engagement arm 22 that projects from the mounting plate 16 and adjustably mates with a second mounting portion 24 that, in turn, attaches to the speaker 14. The first mounting portion 20 will be discussed first, followed by a discussion of the second mounting portion 24.

The first mounting portion 20 of the illustrated embodiment mounts flush against the support structure 18 via the mounting plate 16 and fasteners that fix the mounting plate to the support structure. The engagement arm 22 projects away from the mounting plate 16 along its longitudinal axis 25. In the illustrated embodiment, the engagement arm 22 is generally perpendicular to the mounting plate 16. In other embodiments, however, the engagement arm 22 can be oriented at a selected angle relative to the mounting plate 16.

Figure 4:
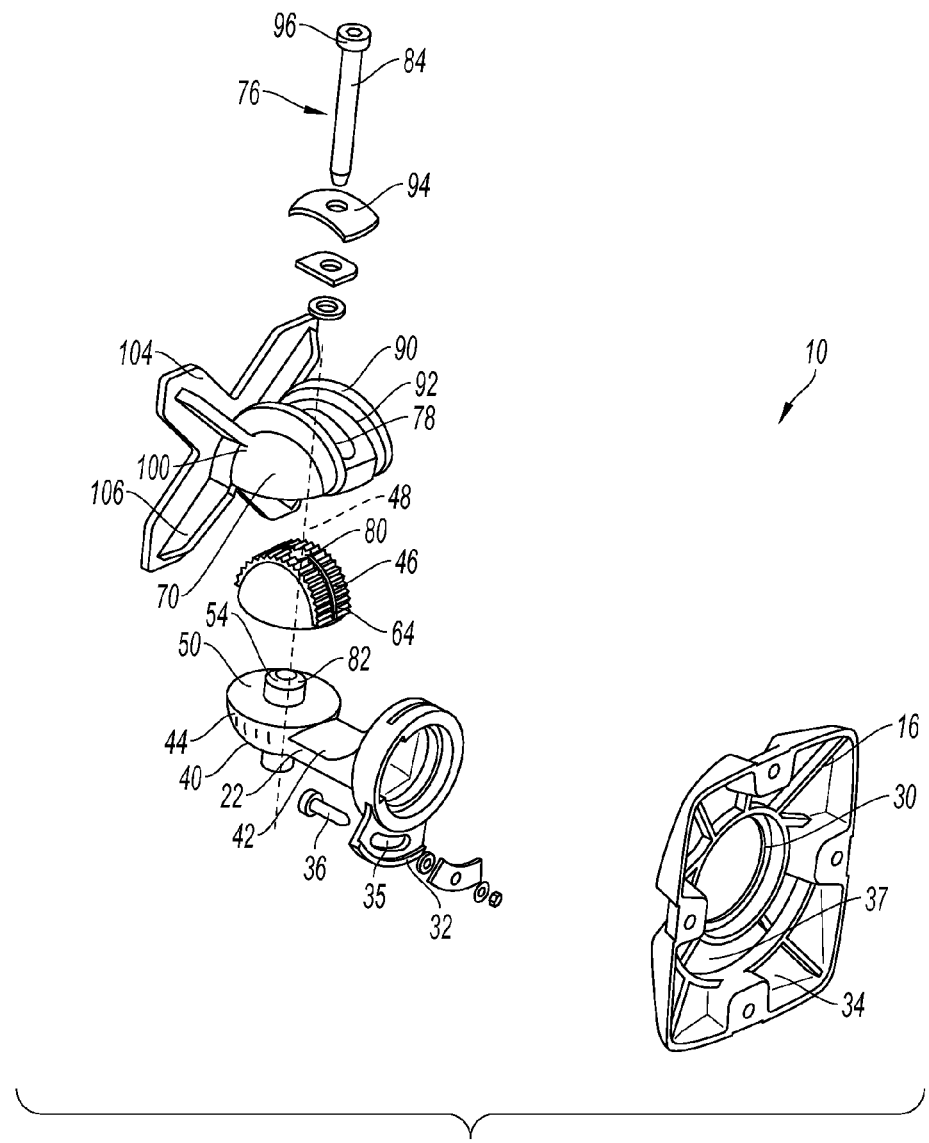
FIG. 4 is a partially exploded perspective view of the first mounting portion that engages a concave receiving portion of the mounting assembly's second mounting portion.

The engagement arm 22 has a rear end portion 28 rotatably attached to the mounting plate for rotation about a first axis of rotation 26. The first axis of rotation 26 substantially corresponds to the engagement arm's longitudinal axis 25. The rear end portion 28 of the illustrated embodiment projects through an aperture 30 in the mounting plate 16. As shown in FIGS. 2 and 4, the arm's rear end portion 28 has a flange 32 adjacent to the aperture 30 and positioned in an overlapping arrangement with the rear surface 34 of the mounting plate 16. The flange 32 has an arcuate slot 35 that aligns with a hole 37 in the mounting plate 16 adjacent to the aperture 30. A locking mechanism 36 extends through the hole 37 and the flange's slot 35 to releasably lock the engagement arm 22 in a selected angular orientation relative to the mounting plate. The locking mechanism 36 shown in FIG. 4 is a threaded fastener and nut arrangement. The locking mechanism 36 can be tightened to a locked position that prevents the engagement arm 22 from rotating, and can be loosened to an unlocked position that allows the engagement arm 22 to rotate about the first axis of rotation 26. The locking mechanism 36 in other embodiments can be other locking features moveable between locked and unlocked positions to restrict or allow rotation of the engagement arm 22.

In the illustrated embodiment, the length of the slot 35 in the flange defines the engagement arm's range of rotation about the first axis of rotation 26. This rotational adjustment of the engagement arm 22 allows for adjustment of the "twist" position of the second mounting portion 24 and the associated speaker 14 (or other mounted device) relative to the support structure 18 (FIG. 3). In at least one embodiment, the engagement arm 22 can be rotated about the first axis of rotation 26 through a range of approximately 20-30°. Other embodiments can provide other ranges of motion, including up to 360° about the first axis of rotation 26. The engagement arm 22 and/or the mounting plate 16 can provide indicia that indicate the angular orientation of the engagement arm 22. In the illustrated embodiment, visual indicators are provided on the engagement arm's rearward end 28 and on the mounting plate 16 adjacent to the aperture 30 so as to allow a user to visually identify where the engagement arm is within its range of angular orientation.

The mounting assembly's configuration that allows for adjustment of the speaker's twist position can be very beneficial in many applications. In other applications, such adjustment of the twist position may not be needed. Accordingly, in another embodiment, the engagement arm 22 can be fixed to the mounting plate 16 in a non-rotatable configuration. The engagement arm 22 may be a separate component securely fixed to the mounting plate 16. Alternatively, the engagement arm 22 can be integrally connected to the mounting plate 16, thereby rendering the locking mechanism 36 unnecessary.

Figure 5:
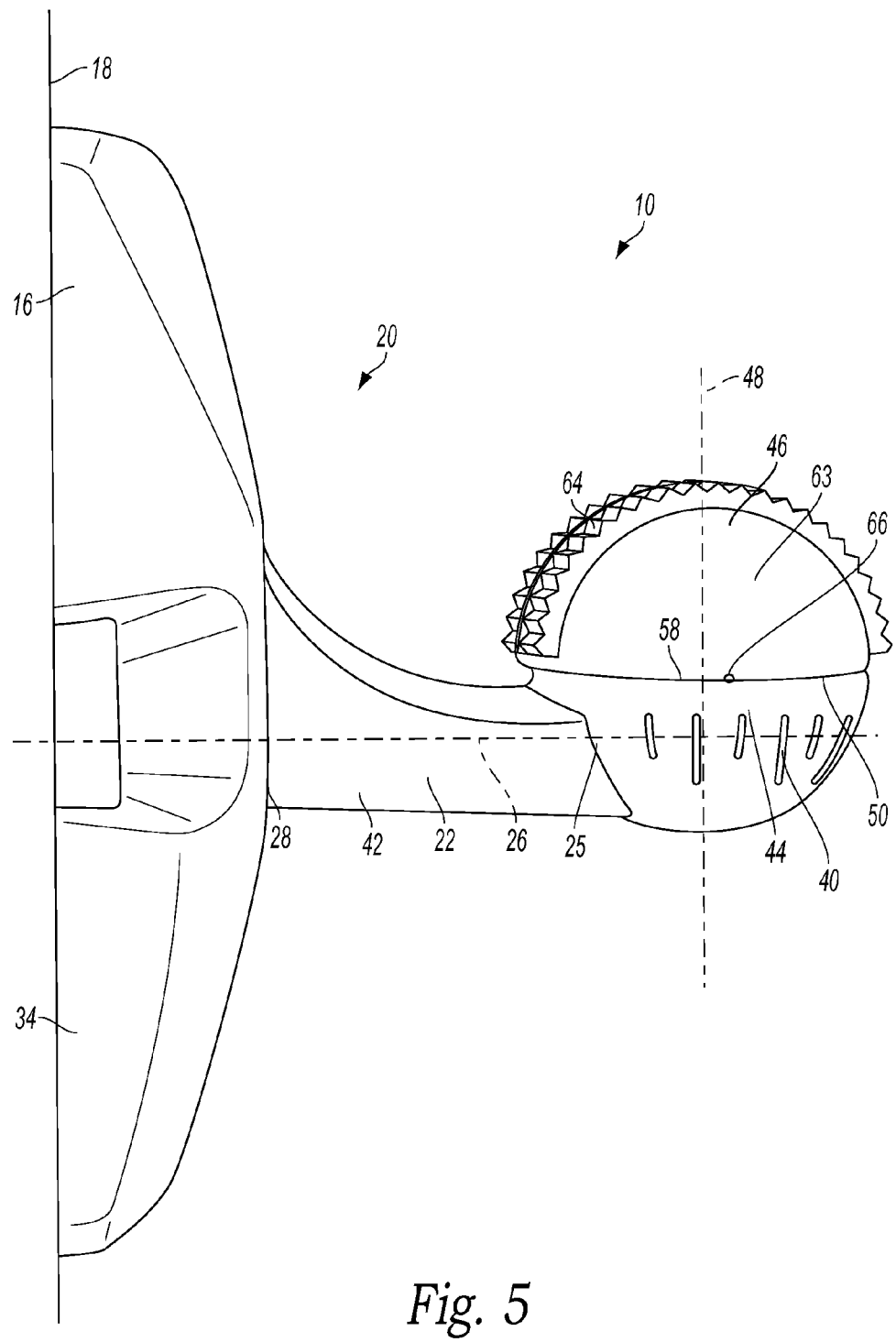
FIG. 5 is an enlarged side elevation view of a first mounting portion of the mounting assembly of FIG. 2 shown removed from the support structure and the second mounting portion of the assembly.
Figure 6:
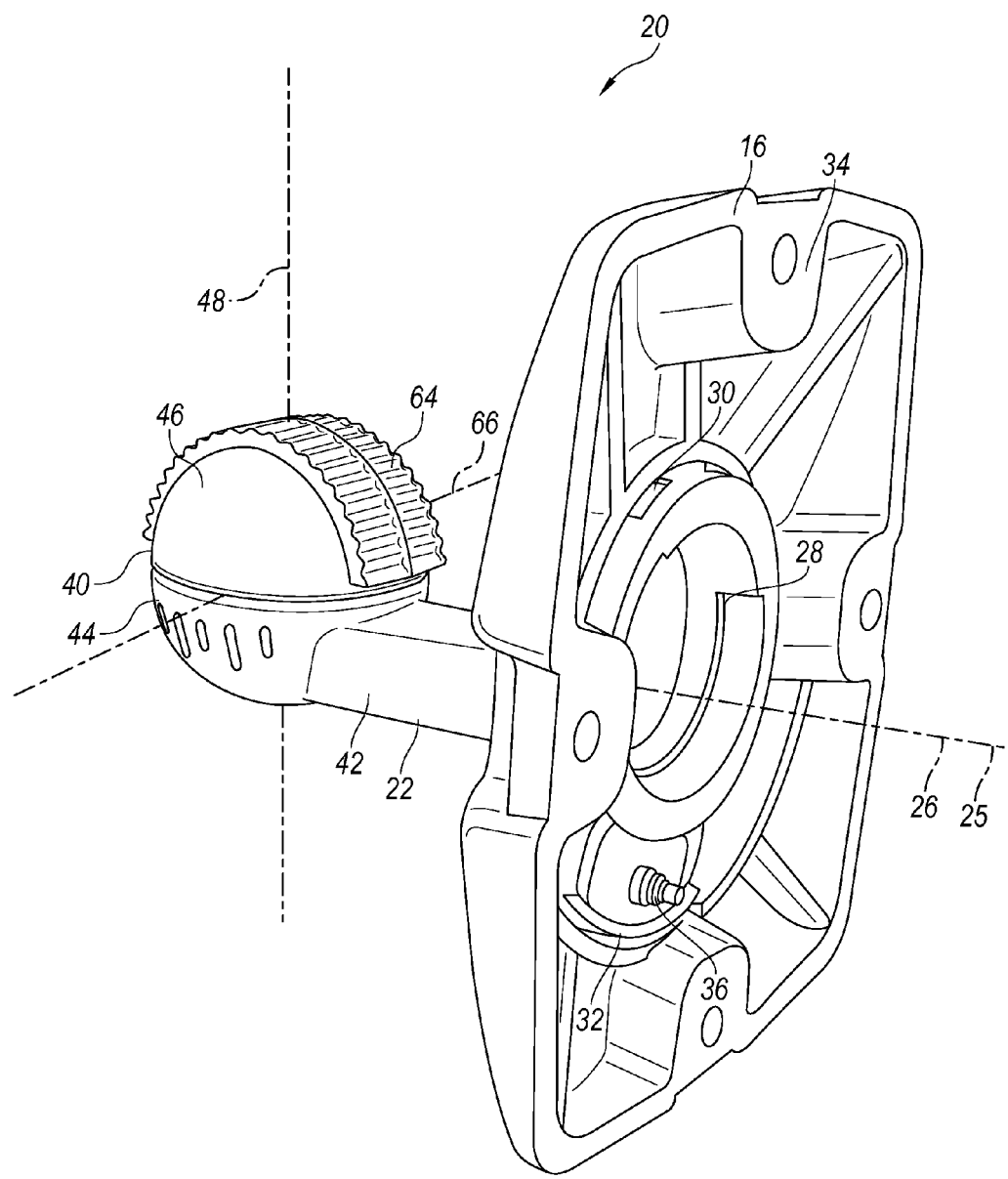
FIG. 6 is a rear perspective view of the first mounting portion of FIG. 5.

As seen in FIGS. 5 and 6, the engagement arm 22 is cantilevered relative to the mounting plate 16 with the arm's forward end portion 40 spaced apart from the rearward end portion 28 by an intermediate segment 42. The forward end portion 40 has a supporting portion 44 integrally connected or otherwise securely fixed to the intermediate segment 42. The forward end portion 40 also has a pan/tilt adjustment member 46 rotatably disposed on the supporting portion 44. The pan/tilt adjustment member 46 is rotatable relative to the supporting portion 44 about a second axis of rotation 48 oriented at a selected orientation relative to the first axis of rotation 26. In the illustrated embodiment, the second axis of rotation 48 is substantially normal to the first axis of rotation 26.

The engagement arm's supporting portion 44 and the pan/tilt adjustment member 46 are each semi-spherical members that together form a ball structure at the forward free end 40 of the engagement arm 22. Although the illustrated embodiment provides a ball structure at the engagement arm's free end, the supporting portion 44 and/or the pan/tilt adjustment member 46 in other embodiments can have other shapes or configurations while still achieving the support and the pan/tilt orientation adjustment of the mounting assembly 10.

Figure 7:
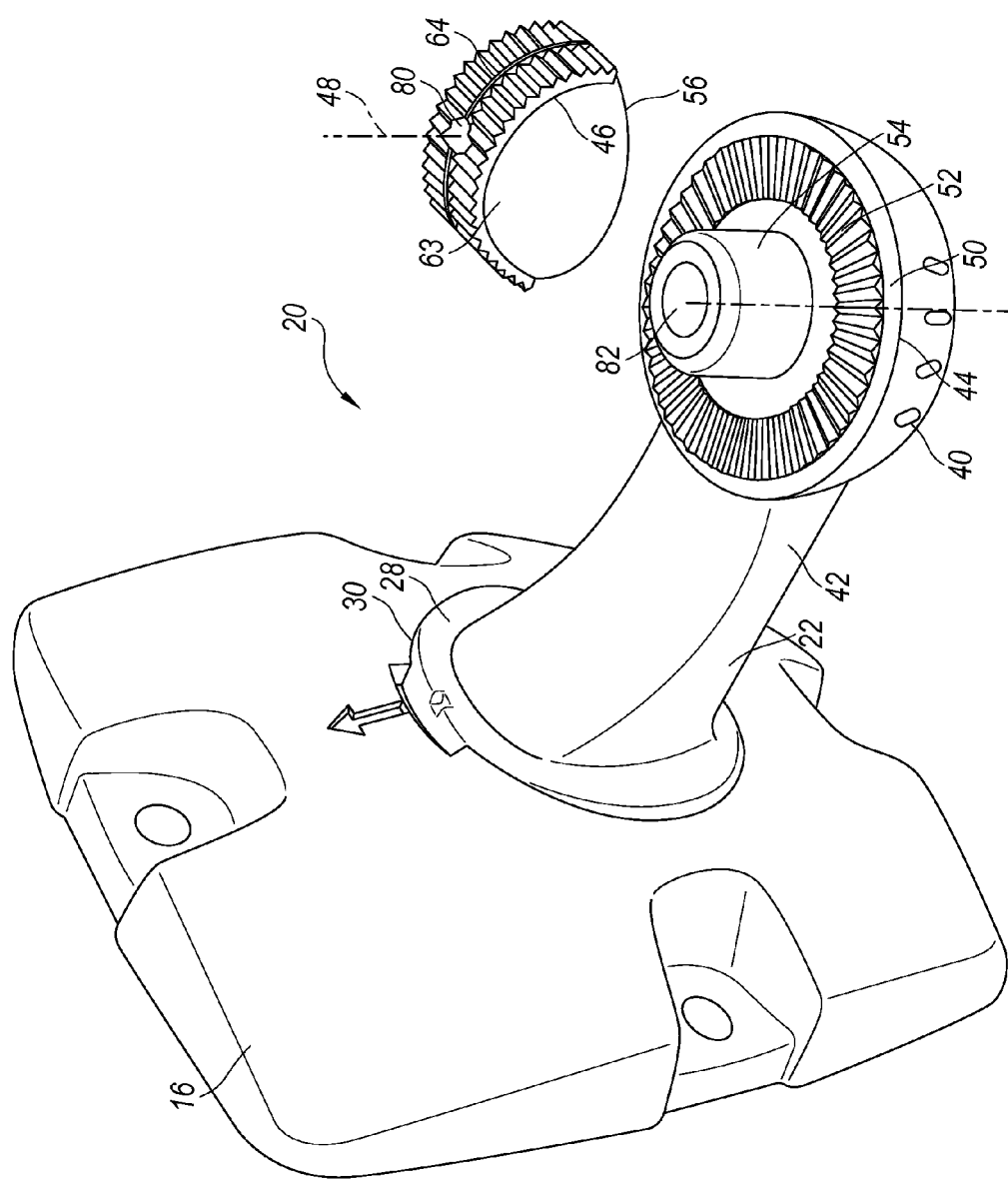
FIG. 7 is a partially exploded front perspective view of the first mounting portion of FIG. 2 with an upper pan/tilt adjustment member shown removed from the engagement arm's partially spherical end portion.

As seen in FIG. 7, the supporting portion 44 has a generally circular upper surface 50 and a central boss 54 projecting away from the upper surface 50. The supporting portion 44 also has a plurality of gear teeth or serrations 52 projecting from the upper surface 50 and being disposed around the central boss 54. The central boss 54 and the serrations 52 are each symmetrically disposed about the second axis of rotation 48. In the illustrated embodiment, the serrations 52 are arranged in an annular configuration on the upper surface 50 radially outward of the central boss 54, so that the pan/tilt adjustment member 46 can smoothly rotate around the central boss 54, and about the second axis of rotation 48.

Figure 8:
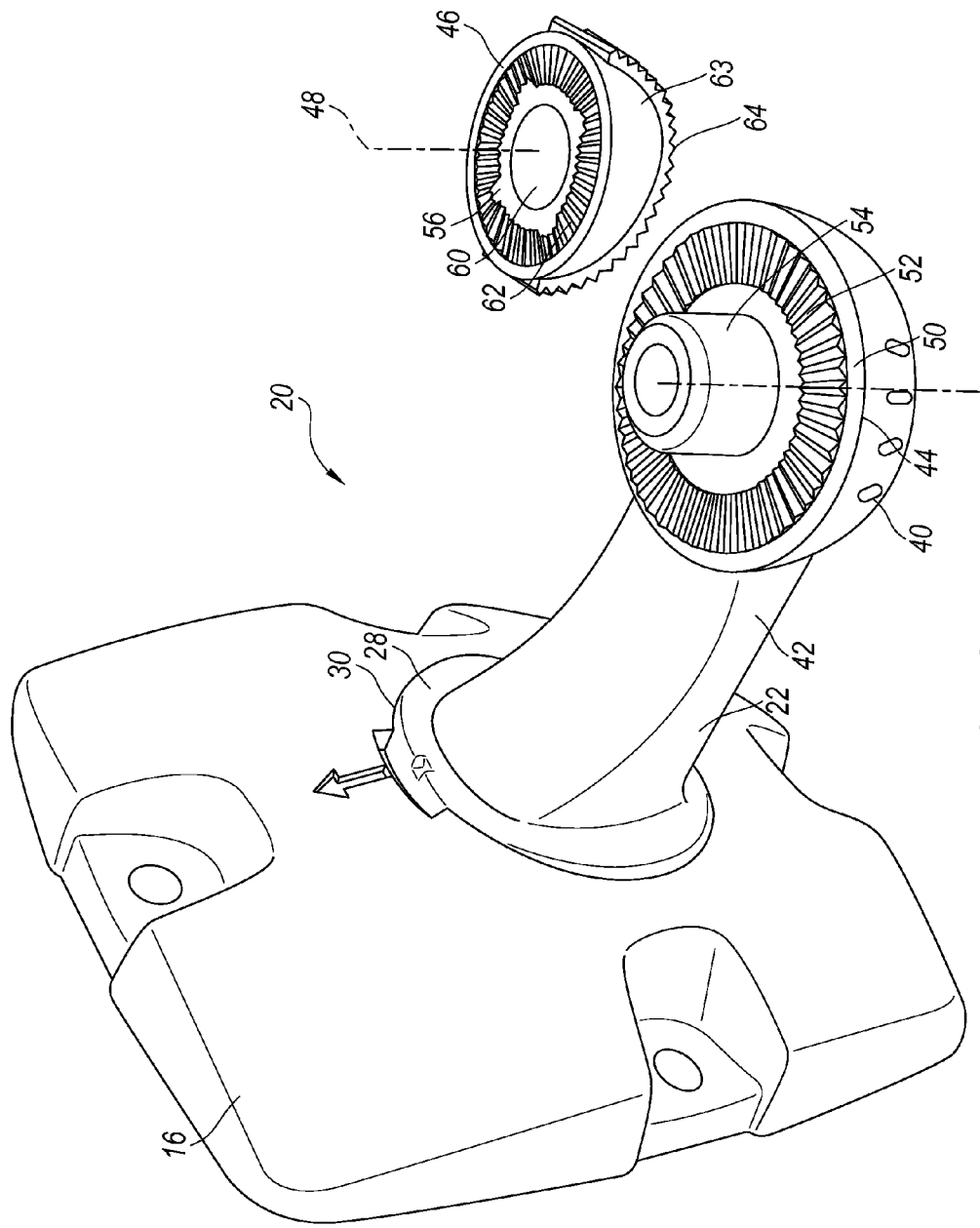
FIG. 8 is a partially exploded front perspective view of the first mounting portion of FIG. 6 with the upper pan/tilt adjustment member shown removed and inverted from the engagement arm's partially spherical end portion.

As shown in FIG. 8, the bottom of the pan/tilt adjustment member 46 has a central aperture 60 extending away from the member's bottom surface 56. The central aperture 60 is sized to closely receive the supporting portion's central boss 54. The bottom surface 56 also has a plurality of gear teeth or serrations 62 disposed in an annular pattern about the central aperture 60. The serrations 62 on the pan/tilt adjustment member 46 are shaped and sized to intermesh with the serrations 52 on the supporting portion's upper surface 50.

The pan/tilt adjustment member 46 is movable relative to the supporting portion 44 between released and locked positions. When the pan/tilt adjustment member 46 is in the locked position, it is held securely against the supporting portion with the first and second serrations 52 and 62 intermesh with each other. This intermeshed interface between the mating serrations prevents the pan/tilt adjustment member 46 from inadvertently rotating about the second axis of rotation 48. Accordingly, this intermeshed engagement of the serrations 52 and 62 provides a mechanical locking arrangement between the pan/tilt adjustment member 46 and the supporting portion 44 to prevent unwanted slip or movement of the speaker 14 about the second axis of rotation 48 when in the locked position. When the pan/tilt adjustment member 46 is in the released position, the pan/tilt adjustment member 46 is allowed to move normally away from the supporting portion's upper surface 50, so the serrations 62 and 52 are not intermeshed or are allowed to move away from the intermeshed configuration. Accordingly, the pan/tilt adjustment member 46 can rotate about the central boss 54 and about the second axis of rotation 48 when in the released position.

The number of teeth forming each of the set of serrations 52 and 62 can be selected to control the degree of adjustability of the pan-position. For example, a greater number of teeth in each of the set of serrations 52 and 62 provide for a larger or more granular degree of adjustability of the mounting assembly's pan-position. Conversely, a smaller number of teeth in each of the set of serrations 52 and 62 provides for a more rough degree of adjustability of the mounting assembly's pan-position.

The pan/tilt adjustment member 46 allows for pan adjustment of the second mounting portion 24 (and the associated speaker 14 or other mounted device) about the second axis of rotation 48 through a selected range of angles. In the illustrated embodiment, the first and second mounting portions 20 and 24 are sized and configured for pan adjustment through a rotational range of approximately 50-55° about the second axis of rotation 48. Other embodiments can provide other ranges of rotation. As an example, a mounting assembly with a longer engagement arm 22 may be configured for pan adjustment through a rotational range of approximately 180° or more. In yet another embodiment, the first and second mounting portions 20 and 24 may be configured to allow for a full 360° pan adjustment via the pan/tilt adjustment member 46 about the second axis of rotation 48.

As seen in FIG. 7, the illustrated pan/tilt adjustment member 46 has a convex, semi-spherical upper surface 63 and a plurality of gear teeth or serrations 64 projecting radially away from the upper surface 63. The serrations 64 are arranged in a partially cylindrical pattern and are disposed about a third axis of rotation 66, which is substantially normal to the second axis of rotation 48. The third axis of rotation 66 can also be perpendicular to the first axis of rotation 26 depending upon the angular orientation of the pan/tilt adjustment member 46 atop the supporting portion 44. The serrations 64 form an arcuate, tilt-adjustment engagement portion that mates with and releasably locks with the second mounting portion 24 of the mounting assembly 10, discussed in greater detail below. While the illustrated embodiment provides a semi-spherical pan/tilt adjustment member 46 with the upper serrations 64 disposed in a partially cylindrical arrangement, the pan/tilt adjustment member 46 can have an upper surface with a different shape that still supports the serrations 64 in an arcuate pattern for adjustment of the mounting assembly's tilt position about the third axis of rotation 66.

Figure 9:
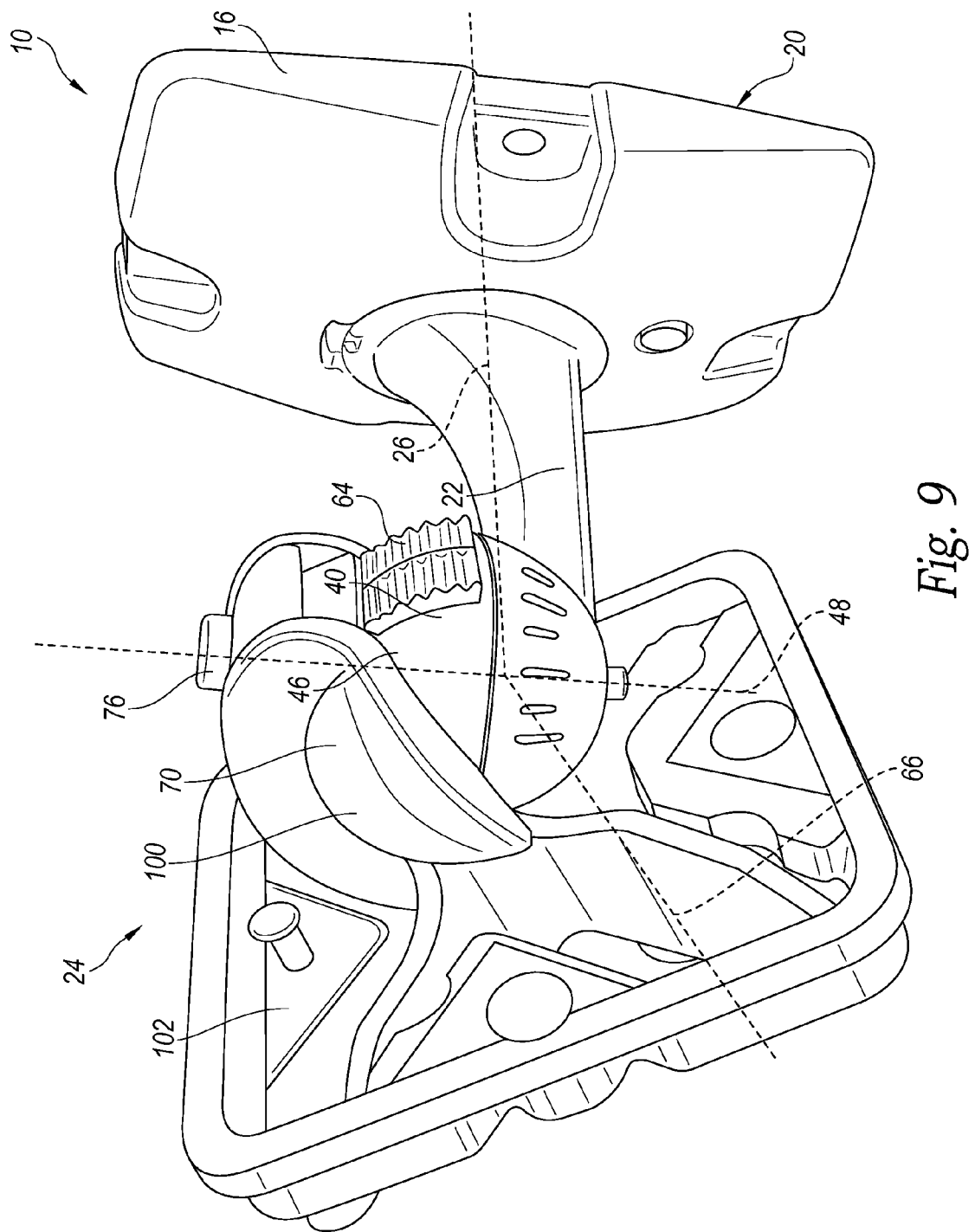
FIG. 9 is a perspective view of the mounting assembly of FIG. 2 shown with the first and second mounting portions of the mounting assembly in different pan and tilt orientations.
Figure 10:
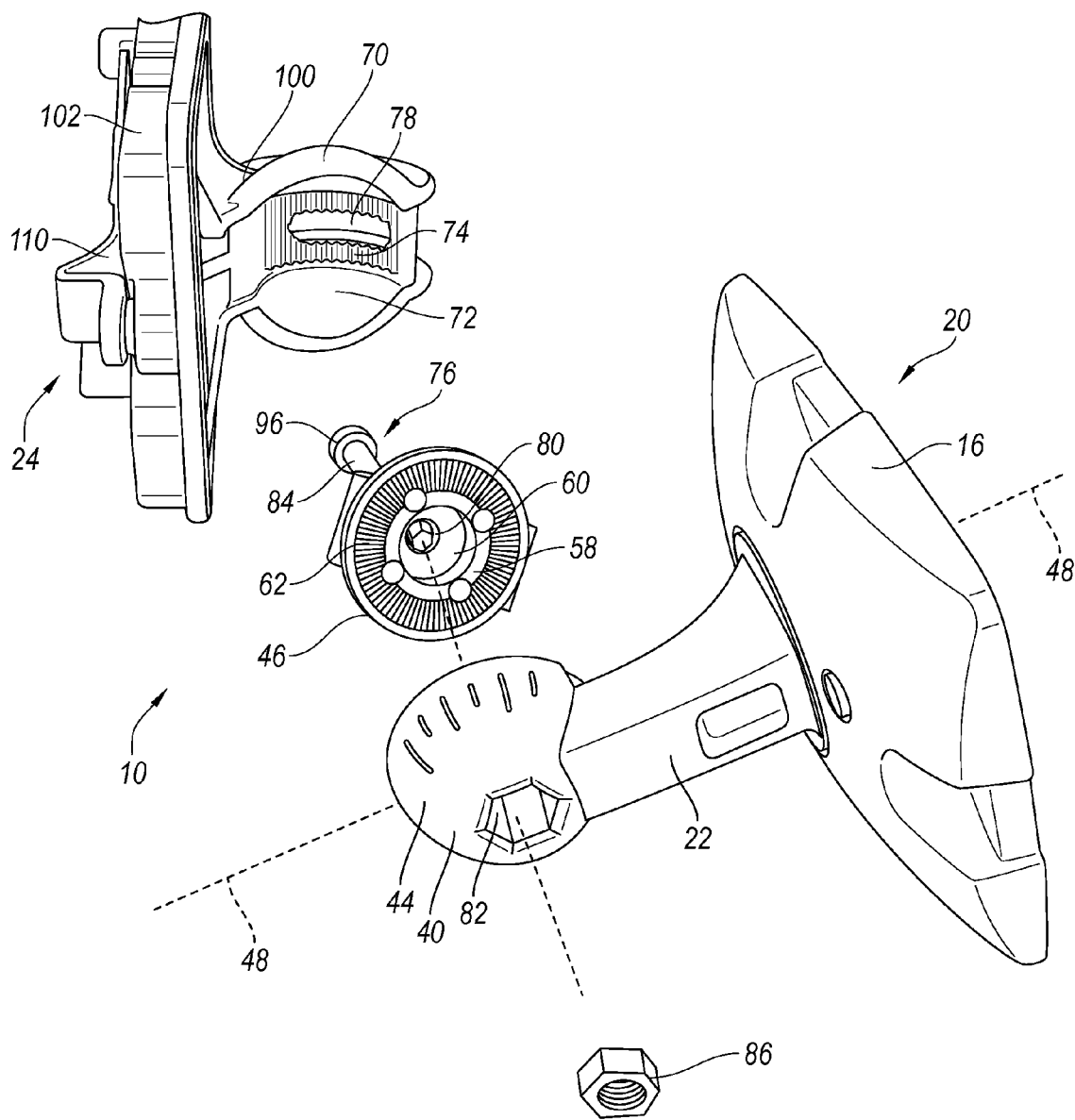
FIG. 10 is a partially exploded bottom perspective view of the mounting assembly of FIG. 2.

As best seen in FIGS. 9 and 10, the second mounting portion 24 has a semi-spherical, concave receiving portion 70 that adjustably mates with the ball-shaped forward end portion 40 of the first mounting portion 20 in a serration-enhanced, ball-and-socket joint configuration. The receiving portion 70 has an interior surface 72 and a plurality of gear teeth or serrations 74 projecting away from the interior surface 72. The serrations 74 are arranged in an arcuate configuration that mates with the serrations 64 on the upper surface 63 of the pan/tilt adjustment member 46 when the ball end of the engagement arm 22 is received in the concave receiving portion 70. In this arrangement, the serrations 74 in the receiving portion 70 are disposed about the third axis of rotation 66 and positioned to intermesh with the serrations 64 on the pan/tilt adjustment member 46.

The concave receiving portion 70 is movable about the third axis of rotation 66 over the pan/tilt adjustment member 46. This allows the tilt position of the second mounting portion 24 to be angularly adjusted relative to the first mounting portion 20 through a selected range of tilt angles. The tilt position of the second mounting portion 24 can be adjusted independently of the pan-position or twist position of the first and/or second mounting portions 20 and 24.

The concave receiving portion 70 is movable relative to the pan/tilt adjustment member 46 between a released, adjustment position and a locked, fixed position. When the receiving portion 70 is in the released, adjustment position, the concave portion 70 can be moved about the third axis of rotation 66 over the convex surface of the pan/tilt adjustment member 46. Accordingly, the serrations 74 in the receiving portion 70 can move over the serrations 64 on the upper surface of the pan/tilt adjustment member 46 until the selected tilt position of the second mounting portion 24 is achieved. When the receiving portion 70 is in the locked, fixed position, the receiving portion 70 is held in firm engagement with the pan/tilt adjustment member 46, such that the serrations 64 and 74 are securely intermeshed with each other. This intermeshed arrangement of the serrations 64 and 74 in the locks, fixed position provides a mechanical locking arrangement between the pan/tilt adjustment member 46 and receiving portion 70 to prevent unwanted slip, creep, or movement of the second mounting portion 24 about the third axis of rotation 66 away from the selected tilt position. Accordingly, this intermeshed configuration provides a positive mechanical engagement that between the first and second mounting portion 20 and 24 to reliably maintain the selected tilt position for the speaker or other mounted device relative to the first mounting portion 20.

In the illustrated embodiment, the receiving portion 70 and the pan/tilt adjustment member 46 with their respective serrations 74 and 64 provide tilt adjustments about the third axis of rotation 66 through a range of approximately 35-40°. In one embodiment, the receiving portion 70 and pan/tilt adjustment member 46 are configured to provide tilt adjustments through a range of approximately 37°. Other embodiments can be configured to allow for a larger or smaller range of tilt angle adjustments.

As shown in FIG. 4, the mounting assembly 10 has a locking mechanism 76 that releasably interconnects the receiving portion 70 of the second mounting portion 24 with the pan/tilt adjustment member 46 of the first mounting portion 20. The locking mechanism 76 is also configured to securely hold the pan/tilt adjustment member 46 against the supporting portion 44.

The locking mechanism 76 extends through an elongated slot 78 formed in the receiving portion 70 in alignment with the serrations 74 on the interior surface 72. The locking mechanism 76 also extends through coaxially aligned apertures 80 and 82 in each of the pan/tilt adjustment member 46 and the supporting portion 44, respectively. In the illustrated embodiment, the locking portion is substantially axially aligned with the second axis of rotation 48.

The locking mechanism 76 is movable between locked and released positions. When the locking mechanism 76 is in the locked position, it firmly squeezes the receiving portion 70, the pan/tilt adjustment member 46 and the supporting portion 44 together along the second axis of rotation. Accordingly, the receiving portion 70 is held in the fixed position in firm engagement with the pan/tilt adjustment member 46, with the respective serrations 74 and 64 in the intermeshed arrangement, thereby preventing unwanted tilting motion of the receiving portion relative to the pan adjustment portion. The locking mechanism 76 in the locked position also securely holds the pan/tilt adjustment member 46 in firm engagement with the supporting portion, with the serrations 52 and 62 in firm engagement in the intermeshed configuration, thereby preventing unwanted rotation of the pan/tilt adjustment member about the second axis of rotation 48.

When the locking mechanism 76 is in the released position, the receiving portion 70 can move axially by a selected distance away from the pan/tilt adjustment member 46 to its adjustment position so as to allow for angular movement of the receiving portion 70 about the third axis of rotation, thereby adjusting the tilt angle position of the second mounting portion 24. In addition, the locking mechanism in the released position allows the pan/tilt adjustment member 46 to move axially by a selected distance away from the supporting portion 44. This allows the pan/tilt adjustment member 46 to be rotated about the second axis of rotation 48, thereby adjusting the pan-position of the second mounting portion 24.

In the illustrated embodiment, the locking mechanism 76 includes a threaded shaft 84 that mates with a threaded nut 86 on the bottom side of the supporting portion 44 opposite the pan/tilt adjustment member 46. Accordingly, the locking mechanism 76 can move between the locked and released positions by tightening or loosening the threaded shaft 84 and mating nut 86. In the illustrated embodiment, a pair of arcuate flanges 90 project from the top surface of the receiving portion 70 and are disposed on opposite sides of the slot 78 to define an arcuate channel 92. The locking mechanism 76 includes a pressure distribution member 94 positioned in the channel 92 between the flanges 90. In the illustrated embodiment, the pressure distribution member 94 is an arcuate washer securely captured between the shaft's enlarged head 96 and the top surface of the receiving portion 70. When the locking mechanism 76 is moved to the locked position, the enlarged head 96 presses firmly against the pressure distribution member 94, which better distributes the locking forces over the receiving portion 70 to maximize the intermeshed engagement of the serrations 74 and 64. This configuration also provides a substantially even pressure distribution between the pan/tilt adjustment member 46 and the supporting portion 44 of the first mounting portion 20.

Although the illustrated embodiment uses a threaded shaft member, such as a bolt and nut, other embodiments can use other locking mechanisms to retain the first and second mounting portions 20 and 24 in the intermeshed engagements to prevent unwanted movement in the mounting assembly 10. In at least one embodiment, the locking mechanism 76 can be a locking device, such as an over-center locking cam system that does not require additional tools for movement between the locked and released positions.

The illustrated arrangement of the first and second mounting portions 20 and 24 allows for pan, tilt, and twist adjustment of the mounting assembly 10 about the first, second, and/or third axes of rotation, while eliminating slip or creep over time. The configuration also allows for repetitive adjustment of the first and second mounting portions positions relative to each other over time without substantive degradation to the holding power of the mounting assembly 10 in the selected pan, tilt, and/or twist position of the mounted device relative to the first mounting portion 20.

Figure 11:
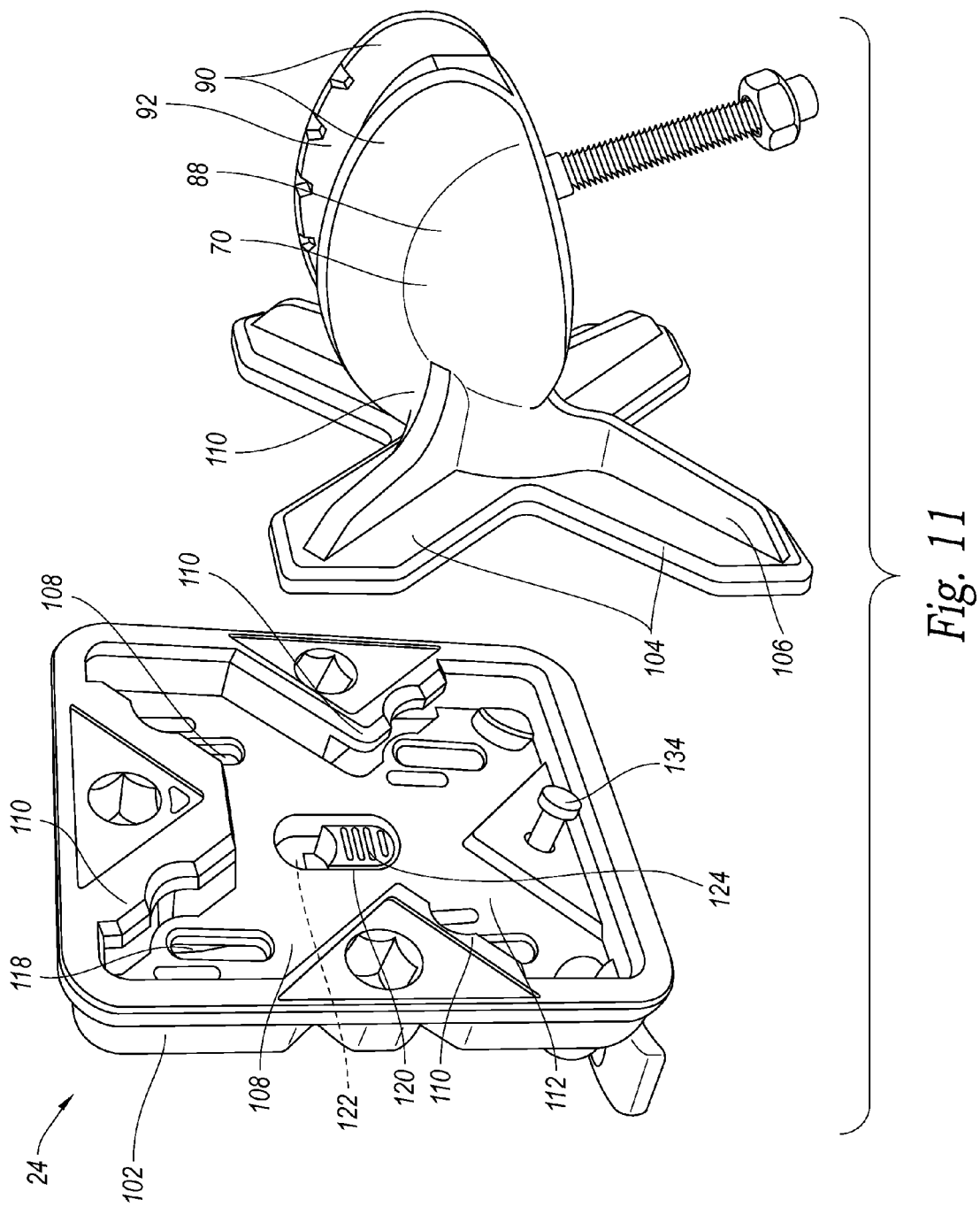
FIG. 11 is a partially exploded rear perspective view of the second mounting portion of FIG. 2 with an attachment portion shown separated from a mounting tray.
Figure 12:
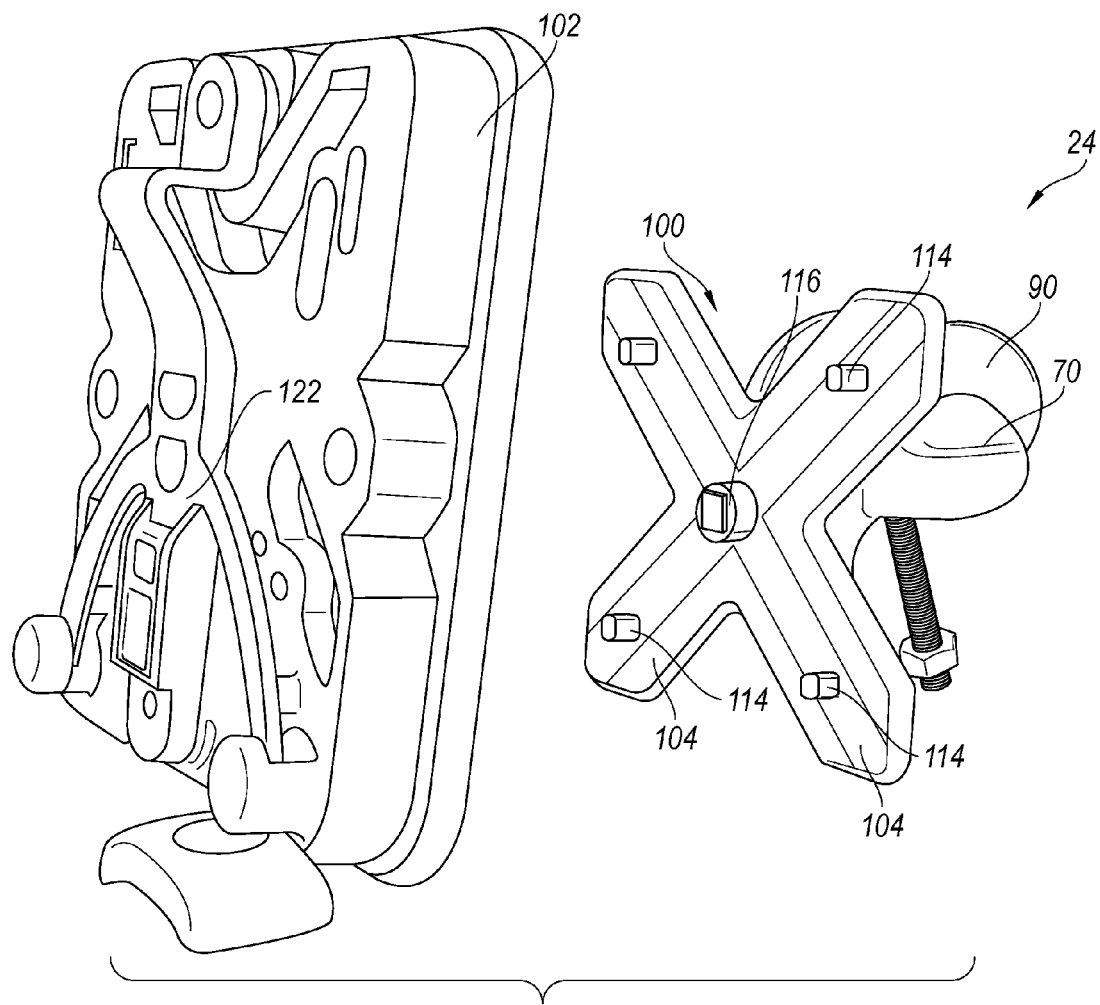
FIG. 12 is a partially exploded front perspective view of the second mounting portion of FIG. 11.

Referring now to FIGS. 11 and 12, the second mounting portion 24 has an attachment structure 100 integrally connected to the receiving portion 70 opposite the first mounting portion 20. The attachment structure 100 is removably received in a mounting tray 102 that attaches to the speaker 14

(FIG. 1) or other mounted device. The mounting tray 102 has a plurality of fastener apertures 140 that receive fasteners that may be used to fix the mounting tray 102 to the speaker 14 or other mounted device.

In the illustrated embodiment, the attachment structure 100 includes a plurality of flanges 104 that define an X-shape. The flanges 104 can have stiffening members 106 that increase the stiffness and strength of the flanges 104. Other embodiments can have the attachment structure 100 with different shapes or configurations that may or may not include the stiffening members 106.

Figure 13:
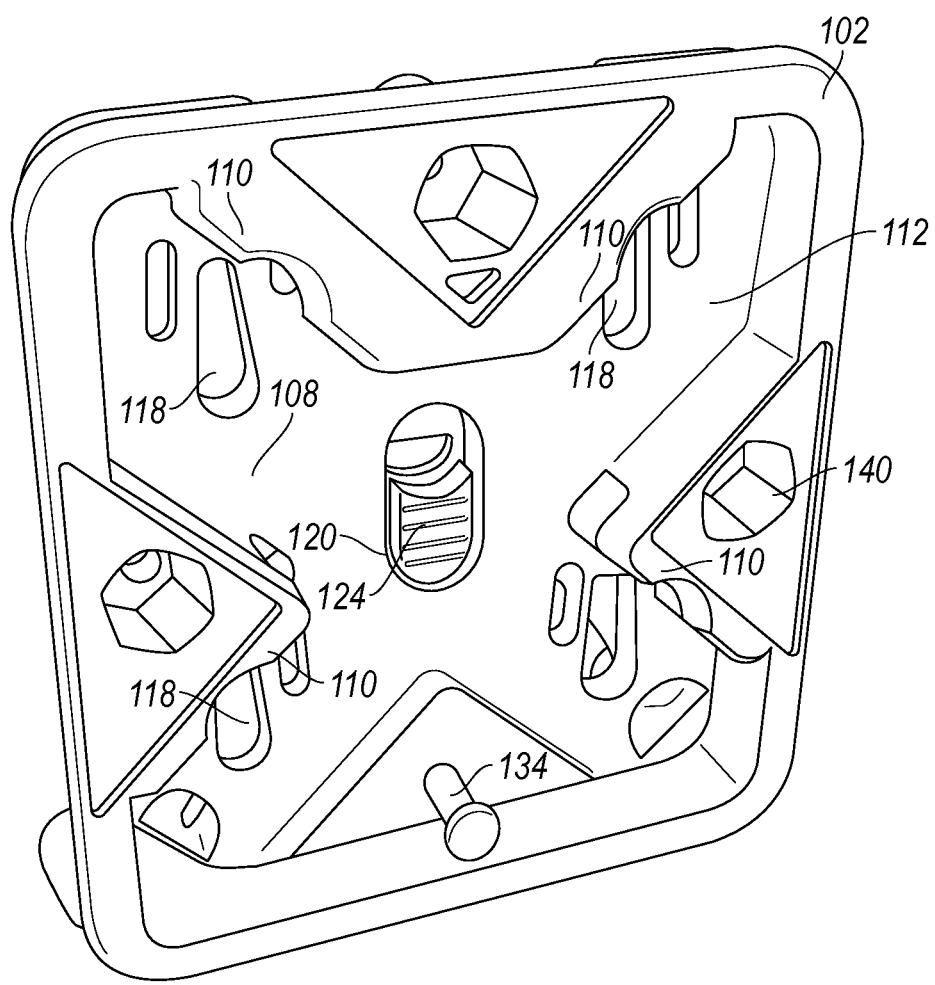
FIG. 13 is an enlarged perspective view of the mounting tray of FIG. 11.
Figure 14:
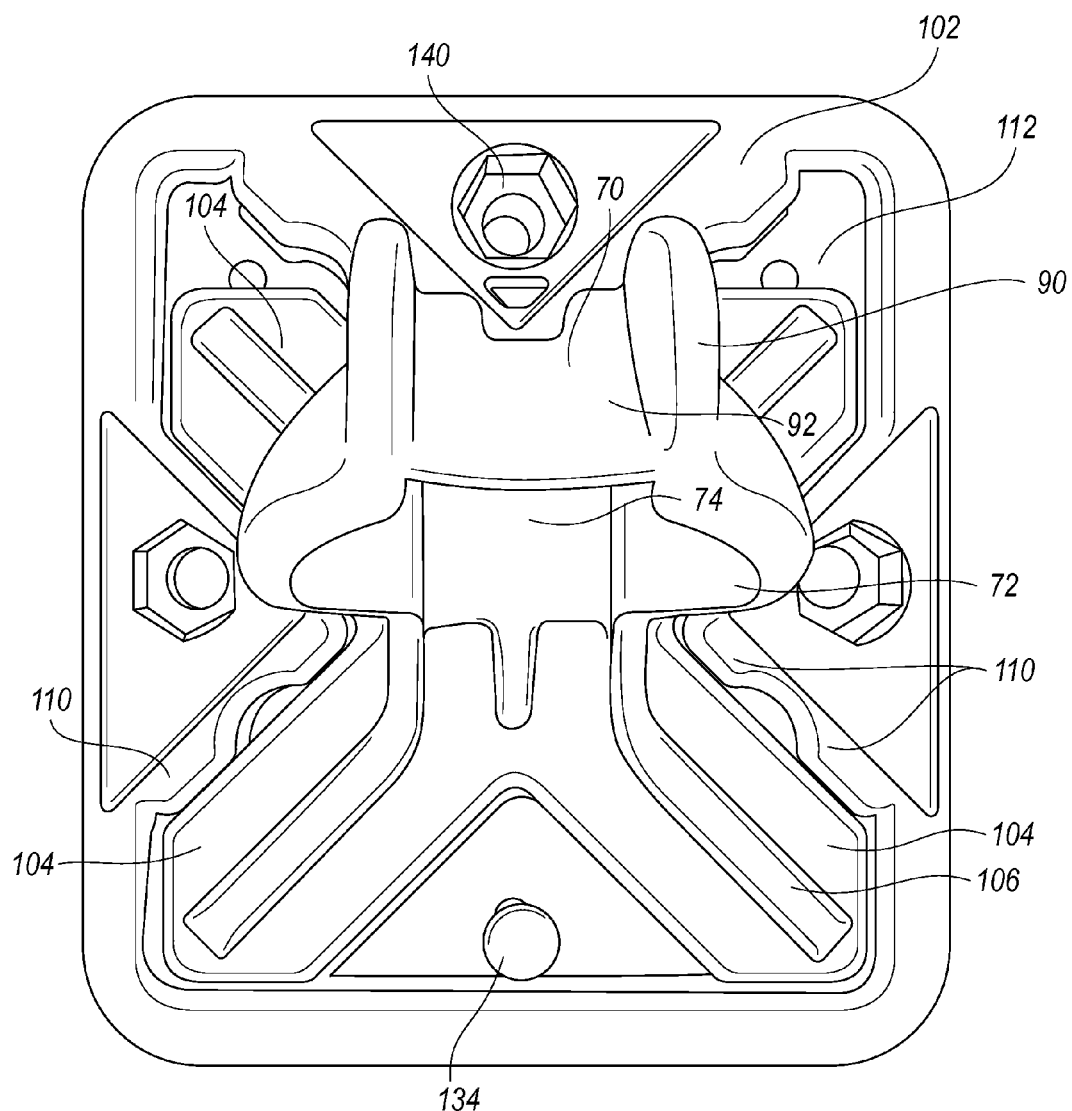
FIG. 14 is a rear elevation view of the attachment portion of FIG. 11 positioned in the mounting tray in a released position.
Figure 15:
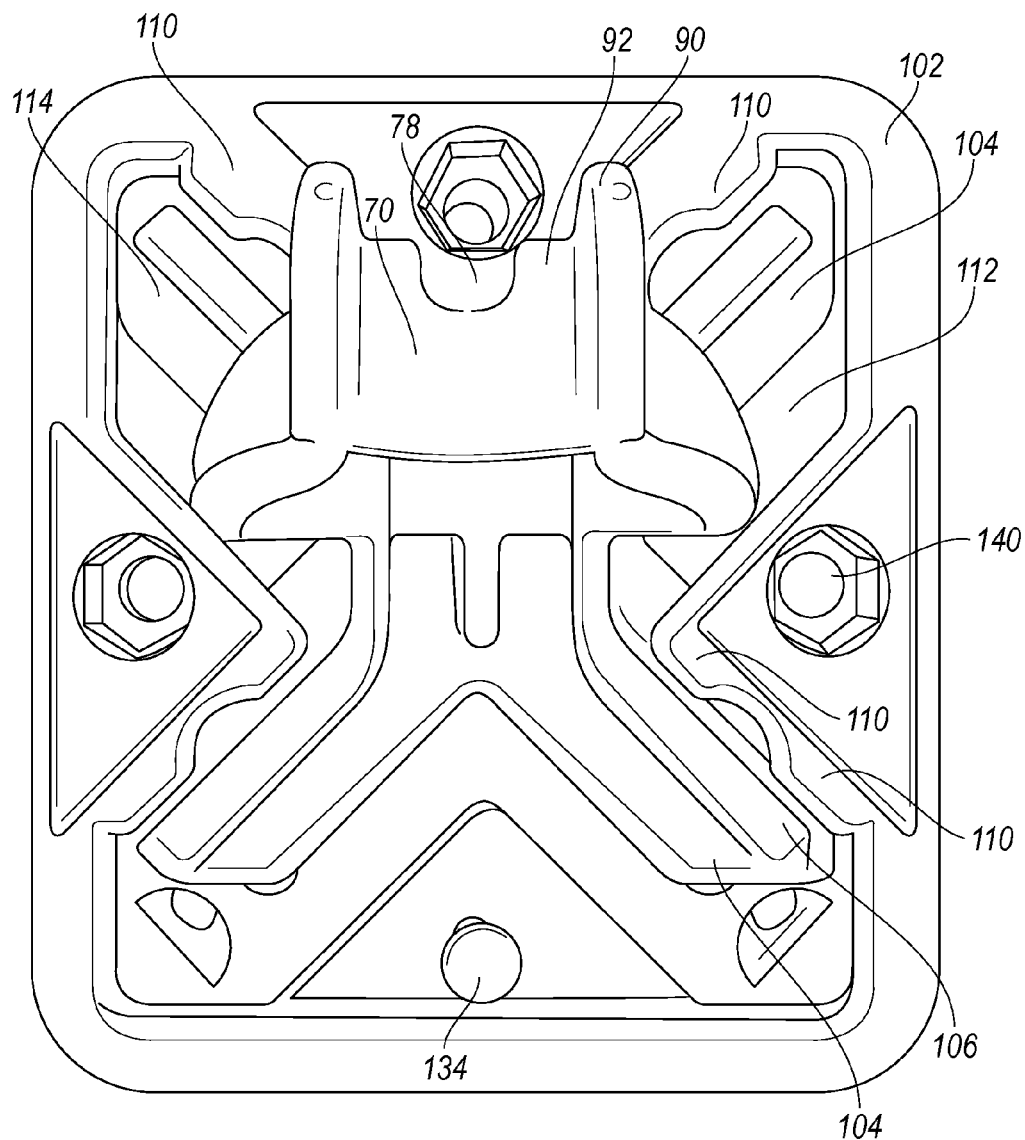
FIG. 15 is a rear elevation view of the attachment portion of FIG. 11 positioned in the mounting tray in an retained position.

As shown in FIG. 13, the attachment structure 100 is releasably attached to the mounting tray 102 so the mounting tray 102, and the associated speaker or other mounted device can be easily separated from the attachment structure 100. The mounting tray 102 has a plurality of retention members 110 spaced apart from a substantially planar front wall 108 to define a generally X-shaped insertion track 112. The insertion track 112 is configured to slidably receive the flanges 104, so that the attachment structure 100 can be moved in the insertion track 112 between released and retained positions. When the attachment structure 100 is in the insertion track 112 and in the released position, as shown in FIG. 14, the retention members 110 do not overlap the flanges 104, so the attachment structure 100 can move freely perpendicular relative to the front wall 108 without interference between the flanges 104 and the retention members 110. Accordingly, the attachment structure 100 can be lifted out of the mounting tray 102 when in the released position. When the attachment structure 100 is moved from the released position to the retained position, as shown in FIG. 15, the flanges 104 slide substantially parallel to the front wall 108 and into an overlapping arrangement with the retention members 110, such that the retention portions block the flanges 104 from moving out of the insertion track 112 perpendicular to the front wall 108.

Referring back to FIG. 12, the front side of the attachment structure 100 has a plurality of alignment tabs 114 projecting forwardly away from the free ends of the flanges 104. The attachment structure 100 also has a central locking tab 116 projecting forwardly away from the intersection of the flanges 104. The mounting tray 102, shown in FIG. 13, has a plurality of alignment slots 118 that receive the alignment tabs 114 and maintain alignment of the attachment structure 100 within the insertion track 112 during movement between the released and retained positions. The mounting tray 102 also has a locking slot 120 that receives the locking tab 116 therein when the attachment structure 100 is positioned in the insertion track 112 and moved between the retained and released positions.

Figure 16:
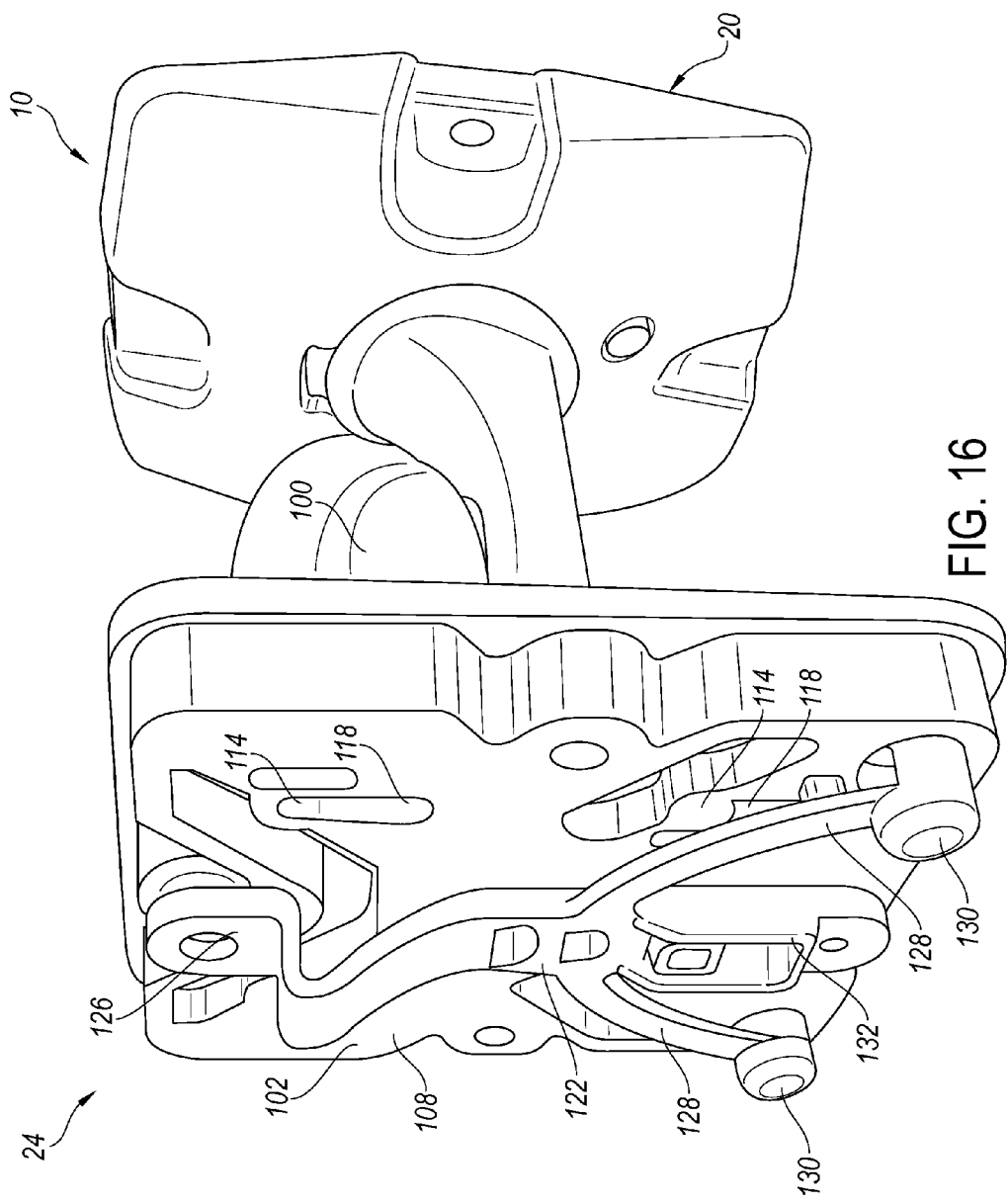
FIG. 16 is a front perspective view of the mounting assembly of FIG. 2 showing the retention mechanism on the front side of the mounting tray.

As seen in FIGS. 12, 13, and 16, the mounting tray 102 has a release mechanism 122 attached to the mounting tray's front wall 108 opposite the insertion track 112. The release mechanism 122 has a retention tab 124 movably disposed in the locking slot 120 (FIG. 13) and configured to releasably retain the attachment structure's locking tab 116 within the locking slot 120 when the attachment structure is in the retained position. Accordingly, when the attachment structure 100 is in the retained position, the locking tab 116 is positioned at the top of the locking slot 120 and the retention tab 124 is positioned in the bottom portion of the locking slot 120. This arrangement prevents the attachment structure 100 from sliding within the insertion track 112 away from the retained position to the released position.

The release mechanism 122 of the illustrated embodiment, shown in FIG. 16, is a resilient, trident-shaped member anchored at its top end 126 to the front wall 108 away from the locking slot 120. Two resilient outer legs 128 of the release mechanism 122 are attached to corner areas 130 of the front wall 108. A center leg 132 of the release mechanism 122 is positioned between the outer legs 128 and adjacent to the front wall 108. The retention tab 124 projects rearwardly from approximately the intersection of the outer legs 128 and the center leg 132. The center leg 132 can be moved forwardly away from the front wall 108. The outer legs 128, however, resiliently bias the center leg 132 toward the front wall 108, thereby removably retaining the retaining tab 124 in the locking slot 120. The retaining tab 124 can be moved away from the locking slot 120 and out of interference with the locking tab 116, thereby allowing the attachment structure 100 to move between the released and retained positions.

As seen in FIG. 13, the release mechanism 122 has a release button 134 configured to press forwardly against the center leg 132, so as to temporarily move the retaining tab 124 out of the locking slot 120. The release button 134 is carried by the front wall 108 of the mounting tray 102 adjacent to the bottom of the center leg 132. The release button 134 is accessible from the rear side of the front wall 108 when the attachment structure 100 is secured in the mounting tray 102 in the retained position. The release button 134 is positioned to be pressed by a user, thereby pressing the release button 134 against the release mechanism's center leg 132 and pushing the center lower leg 132 away from the front wall 108. As the center leg 132 is pushed away from the front wall 108, the retention tab 124 moves with the center leg 132 and is moved out of the locking slot 120. While the center leg 132 is pushed away from the front wall 108, the resilient outer legs 128 remain attached to the corners of the front wall 108, so as to urge the center leg 132 toward the front wall, thereby urging the retention tab 124 toward the locking slot 120. When the retention tab 124 has moved out of the locking slot 120, the locking tab 116 is free to slide within the locking tab, thereby allowing the attachment structure 100 to slide within the mounting tray 102 between the retained and released positions. Accordingly, this configuration provides a quick disconnect feature that allows the speaker or other mounted device carrying the mounting tray 102 to be easily and quickly disconnected from the attachment structure 100 of the mounting assembly 10.

The quick disconnect feature allows interchangeability of speakers or other mounted devices that have similar mounting trays adapted to receive the attachment structure 100 of the mounting assembly 10. The quick disconnect feature also enables a user to remove the speaker or other mounted device from the mounting assembly 10 and adjust the angular orientation of the second mounting portion 24 relative to the first mounting portion 20, as discussed above, without having to wrestle with the weight or shape of the mounted device during the adjustment.

From the foregoing, it will be appreciated that specific embodiments of the invention have been described herein for purposes of illustration, but that various modifications may be made without deviating from the invention. Additionally, aspects of the invention described in the context of particular embodiments or examples may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

We claim:

1. A mounting assembly configured for removably mounting an audio member to a support structure, the assembly comprising:
   a first mounting portion attachable to the audio member;
   a second mounting portion releasably attached to the first mounting portion, the second mounting portion having a first mount configured to be secured to the support structure and a second mount adjustably connected to the first mount, the second mounting portion having a flange portion, an alignment tab, and a locking tab spaced apart from the alignment tab;

the first mounting portion configured to receive and releasably retain the flange portion of the second mounting portion, the first mounting portion comprising:
  a wall portion with an alignment slot positioned to receive the alignment tab therein and a locking slot positioned to receive the locking tab therein;
  a retention portion spaced apart from the wall portion, wherein the wall portion and the retention portion define an insertion track that receives the flange portion;
wherein the flange portion is slideable within the insertion track between first and second positions when the alignment tab is in the alignment slot and the locking tab is in the locking slot, the flange portion in the first position being in an overlapped arrangement with the retention portion, whereby the retention portion blocks the flange portion from moving in a direction normal to the wall portion and out of the first mounting portion, and the flange portion in the second position being out of overlapping alignment with the retention portion, whereby the flange portion is free to move in the normal direction relative to the wall portion for removal of the second mounting portion from the first mounting portion; and
  a locking mechanism coupled to the wall portion and positioned to releasably engage the locking tab in the locking slot to prevent the flange portion from moving out of the first position toward the second position.

2. The mounting assembly of claim 1 wherein the first mounting portion is a tray member securable to the audio member and having a recessed interior area that contains the retention portion and insertion track for receiving the flange portion therein.

3. The mounting assembly of claim 1 wherein the flange portion of the second mounting portion has a plurality of flanges substantially coplanar with each other.

4. The mounting assembly of claim 1 wherein the flange portion of the second mounting portion has a plurality of flanges and a plurality of alignment tabs each projecting from a respective one of the flange members.

5. The mounting assembly of claim 1 wherein the flange portion of the second mounting portion is defined by a plurality of interconnected flanges projecting radially outwardly to form a generally X-shape.

6. The mounting assembly of claim 5 wherein the insertion track is a generally X-shaped insertion track.

7. The mounting assembly of claim 1 wherein the first and second mounting portions are configured with the flange portion of the second mounting portion and the first mounting portion being angularly adjustable relative to the first mount and the support structure about two axes of rotation.

8. The mounting assembly of claim 1 wherein the first and second mounting portions are configured with the flange portion of the second mounting portion and the first mounting being angularly adjustable as a unit relative to the first mount and the support structure about three substantially orthogonal axes of rotation.

9. The mounting assembly of claim 1 wherein the locking mechanism has a lock member movably disposed in at least a portion of the locking slot and being movable between a locked position within the locking slot, and a released position at least partially out of the locking slot, wherein the lock member in the locked position configured to engage the locking tab and releasably retain the flange portion in the first position, and the lock member in the released position being positioned relative to the locking slot out of interference with the locking tab and allowing the flange portion to move from the first position to the second position.

10. The mounting assembly of claim 9 wherein the lock member is biased toward the locked position.

11. A mounting assembly configured to removably mount an audio member to a support structure, the assembly comprising:
  a first mounting portion attached to the audio member; and
  a second mounting portion releasably attached to the first mounting portion, the second mounting portion having a first mount configured to be secured to the support structure and a second mount adjustably connected to the first mount, wherein second mount is angularly adjustable relative to the first mount about at least two axes of rotation, the second mounting portion having a flange portion, an alignment tab coupled to the flange portion, and a locking tab coupled to the flange portion and spaced apart from the alignment tab;
  the first mounting portion configured to receive and releasably retain the flange portion, wherein the audio member, the first mounting portion and the flange portion are movable as a unit relative to the support structure;
  the first mounting portion comprising:
    a wall portion with an alignment slot positioned to receive the alignment tab therein and a locking slot positioned to receive the locking tab therein;
    a retention portion spaced apart from the wall portion, wherein the wall portion and the retention portion define an insertion track that receives the flange portion when the alignment tab is in the alignment slot and the locking tab is in the locking slot;
  wherein the flange portion is slideable within the insertion track between first and second positions, the flange portion in the first position being in an overlapped arrangement with the retention portion, whereby the retention portion blocks the flange portion from moving in a direction normal to the wall portion and out of the first mounting portion, and the flange portion in the second position being out of overlapping alignment with the retention portion, whereby the flange portion is free to move in the normal direction relative to the wall portion for removal of the second mounting portion from the first mounting portion.

12. The mounting assembly of claim 11 wherein the flange portion of the second mounting portion has a plurality of flanges substantially coplanar with each other.

13. The mounting assembly of claim 11 wherein the flange portion is an X-shaped flange portion defined by a plurality of interconnected flanges projecting radially to define a generally X-shape.

14. The mounting assembly of claim 11 wherein the flange portion of the second mounting portion and the first mounting are angularly adjustable as a unit relative to the first mount and the support structure about three axes of rotation.

15. The mounting assembly of claim 11, further comprising a locking mechanism coupled to the wall portion and positioned to releasably engage the locking tab in the locking slot to prevent the flange portion from moving out of the first position toward the second position, wherein the locking mechanism has a lock member movably disposed in at least a portion of the locking slot and being movable between a locked position within the locking slot, and a released position at least partially out of the locking slot, wherein the lock member in the locked position configured to engage the locking tab and releasably retain the flange portion in the first position, and the lock member in the released position being positioned relative to the locking slot out of interference with the locking tab and allowing the flange portion to move from the first position to the second position.

16. The mounting assembly of claim 15 wherein the locking mechanism comprises a release coupled to the lock member and actuatable to move the lock member to the released position.

17. A speaker assembly mountable to a support structure, the speaker assembly, comprising:
  a speaker housing;
  a first mounting portion attached to the speaker housing;
  a second mounting portion releasably attached to the first mounting portion, the second mounting portion having a first mount configured to be secured to the support structure and a second mount adjustably connected to the first mount, wherein an angular orientation of the second mount is adjustable relative to the first mount about at least two axes of rotation, the second mounting portion having a flange portion, an alignment tab, and a locking tab and spaced apart from the alignment tab;
  the first mounting portion configured to receive and releasably retain the flange portion, wherein the speaker housing, the first mounting portion, and the flange portion are rotatable as a unit for angular orientation adjustment of the speaker housing relative to the support structure;
  the first mounting portion comprising:
    a wall portion with an alignment slot positioned to receive the alignment tab therein and a locking slot positioned to receive the locking tab therein;
    retention portion spaced apart from the wall portion defining at least a portion of an insertion track that receives the flange portion;
  wherein the flange portion is slideable within the insertion track between first and second positions when the alignment tab is in the alignment slot and the locking tab is in the locking slot, whereby the retention portion blocks the flange portion from moving in a direction normal to the wall portion and out of the first mounting portion when the flange portion is in the first position, and whereby the flange portion is free to move in the normal direction relative to the wall portion for removal of the second mounting portion from the first mounting portion when the flange portion is in the second position; and
  a locking mechanism coupled to the wall portion and positioned to releasably engage the locking tab in the locking slot to prevent the flange portion from moving out of the first position toward the second position.

18. The speaker assembly of claim 17 wherein the flange portion of the second mounting portion is a generally X-shaped flange portion defined by a plurality of interconnected flanges projecting radially to form an X-shape.

19. The speaker assembly of claim 17 wherein the flange portion of the second mounting portion and the first mounting portion are angularly adjustable relative to the first mount and the support structure about three substantially orthogonal axes of rotation.

20. The speaker assembly of claim 17 wherein the locking mechanism has a lock member movably disposed in at least a portion of the locking slot and being movable between a locked position within the locking slot, and a released position at least partially out of the locking slot, wherein the lock member in the locked position configured to engage the locking tab and releasably retain the flange portion in the first position, and the lock member in the released position being positioned relative to the locking slot out of interference with the locking tab and allowing the flange portion to move from the first position to the second position, and wherein the lock member is biased toward the locked position.

* * * * *